United States Patent
Deb et al.

(10) Patent No.: US 6,172,990 B1
(45) Date of Patent: Jan. 9, 2001

(54) MEDIA ACCESS CONTROL MICRO-RISC STREAM PROCESSOR AND METHOD FOR IMPLEMENTING THE SAME

(75) Inventors: Alak K. Deb; Namakkal S. Sambamurthy, both of San Jose, CA (US); William H. Bares, Germantown, TN (US)

(73) Assignee: XaQti Corporation, Santa Clara, CA (US)

( * ) Notice: Under 35 U.S.C. 154(b), the term of this patent shall be extended for 0 days.

(21) Appl. No.: 08/968,551

(22) Filed: Nov. 12, 1997

Related U.S. Application Data

(60) Provisional application No. 60/050,210, filed on Jun. 19, 1997.

(51) Int. Cl.[7] ................................. H04J 3/16; H04J 3/24
(52) U.S. Cl. .......................... 370/474; 370/466; 370/469
(58) Field of Search .................................. 370/392, 395, 370/397, 469, 466, 463, 474

(56) References Cited

U.S. PATENT DOCUMENTS

| | | | |
|---|---|---|---|
| 5,201,056 | 4/1993 | Daniel et al. | 395/800 |
| 5,420,858 | * 5/1995 | Marshall et al. | 370/395 |
| 5,732,071 | * 3/1998 | Saito et al. | 370/397 |
| 5,812,550 | * 9/1998 | Sohn et al. | 370/395 |
| 5,956,344 | * 9/1999 | Cole | 370/465 |
| 5,959,990 | * 9/1999 | Frantz et al. | 370/392 |
| 5,999,541 | * 12/1999 | Hinchey et al. | 370/466 |

FOREIGN PATENT DOCUMENTS

| | | | |
|---|---|---|---|
| 0725351A2 | 8/1996 | (EP) | 13/36 |

OTHER PUBLICATIONS

Patrick Van Eijk, "Gigabit Ethernet: Technology, Systems, and Network Applications", pp. 85–90, Apr. 1997, Electric Design, vol. 45, No. 7.

Anzaloni et al., "Fiber Channel FCS/ATM interworking: design and performance study," Nov. 28, 1994, IEEE.

Kanakia et al., "The VMP Network Adapter Board (NAB): High–Performance Network Communication for Multiprocessors," 1988, Computer Communications Review, vol. 18, No. 4 pp. 175–187.

"Virtual LANs Get Real," Mar. 1995, Data Communications, vol. 24, No. 3.

* cited by examiner

*Primary Examiner*—Chi H. Pham
*Assistant Examiner*—Brenda H. Pham
(74) *Attorney, Agent, or Firm*—Beyer,Weaver &Thomas,LLP

(57) ABSTRACT

Disclosed are methods and apparatus for processing packet data received from a physical layer. The processing is performed in-line while streaming packets to an upper layer. The method includes loading an instruction set for custom programming the processing of packet data received from the physical layer. Determining a type of packet data received from the physical layer. Identifying a first word location in the packet data based on the contents of the instruction set. Examining the packet data received from the physical layer at the first identified word location. The method further includes storing an element indicative of information contained in the first identified word location into a data structure, and appending the data structure to the packet data before the packet is streamed to the upper layer. The methods and apparatus also have direct applicability to reducing a CPU's work load during transmissions of data over a network.

51 Claims, 16 Drawing Sheets

MEDIA ACCESS CONTROL MICRO-RISC STREAM PROCESSOR AND METHOD FOR IMPLEMENTING THE SAME

CROSS REFERENCE TO RELATED APPLICATIONS

This application claims the benefit of U.S. Provisional Patent Application having Ser. No. 60/050,210, filed on Jun. 19, 1997, entitled "MEDIA ACCESS CONTROL MICRO-RISC STREAM PROCESSOR AND METHOD FOR IMPLEMENTING THE SAME." This application is hereby incorporated by reference.

BACKGROUND OF THE INVENTION

1. Field of the Invention

The present invention relates generally to integrated circuit devices used for processing data through communication networks, and more particularly, to methods and apparatuses for high speed packet processing within the media access control level to reduce host central processing unit processing loads.

2. Description of the Related Art

The Ethernet local area network (LAN) is one of the most popular and widely used computer networks in the world. Since the Ethernet's beginnings in the early 1970's, computer networking companies and engineering professionals have continually worked to improve Ethernet product versatility, reliability and transmission speeds. To ensure that new Ethernet products were compatible, interoperable and reliable, the Institute of Electrical and Electronic Engineers (IEEE) formed a standards group to define and promote industry LAN standards. Today, the IEEE 802.3 standards group is responsible for standardizing the development of new Ethernet protocols and products under an internationally well known LAN standard called the "IEEE 802.3 standard."

Currently, there is a wide variety of standard compliant Ethernet products used for receiving, processing and transmitting data over Ethernet networks. By way of example, these networking products are typically integrated into networked computers, network interface cards (NICs), SNMP/RMON probes, routers, switching hubs, bridges and repeaters. Until recently, common data transmission speeds over Ethernet networks were 10 mega bits per second (Mbps). However, to meet the demand for faster data transmission speeds, the IEEE 802.3 standards committee officially introduced the "IEEE 802.3u standard" in May of 1995. This standard is also referred to as the "100 BASE T Fast Ethernet" standard because of its ability to perform data transmissions up to about 100 Mbps.

FIG. 1A is a diagrammatic representation of an open systems interconnection (OSI) layered model 10 developed by the International Organization for Standards (ISO) for describing the exchange of information between layers. The OSI layered model 10 is particularly useful for separating the technological functions of each layer, and thereby facilitating the modification or update of a given layer without detrimentally impacting on the functions of neighboring layers. At a lower-most layer, the OSI model has a physical layer 12 that is responsible for encoding and decoding data into signals that are transmitted across a particular medium. As is well known in the art, physical layer 12 is also known as the "PHY layer."

Above the physical layer 12, a data link layer 14 is defined for providing reliable transmission of data over a network while performing appropriate interfacing with physical layer 12 and a network layer 16. As shown, data link layer 14 generally includes a logical link layer (LLC) 14a and a media access control layer (MAC) 14b. LLC layer 14a is generally a software function that is responsible for attaching control information to the data being transmitted from network layer 16 to MAC layer 14b. On the other hand, MAC layer 14b is responsible for scheduling, transmitting and receiving data over a link. Thus, MAC layer 14b is primarily responsible for controlling the flow of data over a network, ensuring that transmission errors are detected, and ensuring that transmissions are appropriately synchronized. As is well known in the art, MAC layer 14b generally schedules and controls the access of data to physical layer 12 using a well known carrier sense multiple access with collision detection (CSMA/CD) algorithm.

Network layer 16 is responsible for routing data between nodes in a network, and for initiating, maintaining and terminating a communication link between users connected to the nodes. Transport layer 18 is responsible for performing data transfers within a particular level of service quality. By way of example, a typical software protocol used for performing transport layer 18 functions may be TCP/IP, Novell IPX and NetBeui. Session layer 20 is generally concerned with controlling when users are able to transmit and receive data depending on whether the user is capable of full-duplex or half-duplex transmission, and also co-ordinates between user applications needing access to the network. Presentation layer 22 is responsible for translating, converting, compressing and decompressing data being transmitted across a medium. As an example, presentation layer 22 functions are typically performed by computer operating systems like Unix, DOS, Microsoft Windows 95, Windows NT and Macintosh OS. Finally, Application layer 24 provides users with suitable interfaces for accessing and connecting to a network.

FIG. 1B is a diagrammatic representation of typical Ethernet packets used for transferring data across a network. A packet generally includes a preamble 30 which is 8 bytes long. The last byte (or octet) in the preamble is a start frame delimiter (not shown). After the start frame delimiter octet, a destination address (DA) 32 which is 6 bytes is used to identify the node that is to receive the Ethernet packet. Following DA 32, is a source address (SA) 34 which is 6 bytes long, SA 34 is used to identify the transmitting node directly on the transmitted packet. After the SA 34, a length/type field (L/T) 36 (typically 2 bytes) is generally used to indicate the length and type of the data field that follows. As is well known in the art, if a length is provided, the packet is classified as an 802.3 packet, and if the type field is provided, the packet is classified as an Ethernet packet.

The following data field is identified as LLC data 38 since the data field also includes information that may have been encoded by the LLC layer 14a. A pad 40 is also shown following LLC data 38. As is well known in the art, if a given Ethernet packet is less than 64 bytes, most media access controllers add a padding of 1's and 0's following LLC data 38 in order to increase the Ethernet packet size to at least 64 bytes. Once pad 40 is added, if necessary, a 4 byte cyclic redundancy check (CRC) field is appended to the end of a packet in order to check for corrupted packets at a receiving end. As used herein, a "frame" should be understood to be a sub-portion of data contained within a packet.

As described above, because MAC layer 14b is responsible for controlling the flow of data over a network, MAC layer 14b is generally responsible for encapsulating received LLC data 38 with an appropriate preamble 30, DA 32, SA 34, L/T 36, Pad 40 and CRC 42. Further, an inter-packet gap (IPG) is shown identifying a time span between transmitted Ethernet packets. Conventionally, the IPG is a fixed value that is defined by the 802.3 standard, and imposed by a suitable MAC layer 14*b*. For more information on Ethernet network communication technology, reference may be made to issued U.S. Patents entitled "Apparatus and Method for Full-Duplex Ethernet Communications" having U.S. Pat. No. 5,311,114 and 5,504,738. These patents are hereby incorporated by reference.

Although conventional MAC layer 14*b* circuitry has worked well for slower Ethernet systems, such as, 10 and 100 BASE T systems, high speed systems generally impose high processing burdens on a host's central processing unit (CPU). By way of example, when Ethernet network speeds are accelerated to gigabit levels, the host CPU will generally be required to spend more time processing packet data and less time performing other CPU processing tasks. As a result, the host CPU will tend to experience many more processing interrupts which may hamper packet transmission and receiving operations.

As an example, when packet data is received by the MAC layer 14*b* from the lower physical layer 12, the CPU is conventionally required to scan through each and every bit of data in the order received to locate the byte location of headers and data that may be of interest to upper layer protocols. Once the CPU has laboriously searched the entire packet and ascertained the particular byte locations of interest in each packet, all of this information is made available to upper layers, such as the network layer 16, transport layer 18, session layer 20, presentation layer 22 or the application layer 24. Once these upper layers have the information they need regarding the received packet, these upper layers will be able to complete their assigned tasks. Unfortunately, in high speed networks, the demands on a host CPU tends to increase to levels where scanning through each byte of each received packets is no longer possible without introducing decoding, transmission or packet routing delays.

In addition to the CPU processing performed during the receiving of packet data, the host CPU is also charged with the responsibility of analyzing each byte of an outgoing packet. By way of example, when the host is a switch or a router, the switch or router CPU is generally responsible for managing routing tables, and analyzing flow congestion. In addition, the switch or router CPU is also responsible for building and aging routing tables in an effort to constantly update the status of each and every node in the network. Other host CPU tasks may include performing management tasks, replying to queries from management hosts, building RMON data bases, etc. Accordingly, when a network host is asked to transmit data at increased speeds, the host CPU will unfortunately be more prone to CPU interrupt related delays.

In view of the foregoing, there is a need for methods and apparatuses for media access control layer processing that is well suited to increase transmit and receive packet processing rates while reducing a host CPU's processing burden.

SUMMARY OF THE INVENTION

Broadly speaking, the present invention fills these needs by providing methods and apparatuses for a media access controller having programmable micro-risc stream processors for processing receive and transmit data over a high speed network. It should be appreciated that the present invention can be implemented in numerous ways, including as a process, an apparatus, a system, a device, a method, or a computer readable medium. Several inventive embodiments of the present invention are described below.

In one embodiment, a method for processing packet data received from a physical layer is disclosed. The processing is performed in-line while streaming packets to an upper layer. The method includes loading an instruction set for custom programming the processing of packet data received from the physical layer. Determining a type of packet data received from the physical layer. Identifying a first word location in the packet data based on the contents of the instruction set. Examining the packet data received from the physical layer at the first identified word location. The method further includes storing an element indicative of information contained in the first identified word location into a data structure, and appending the data structure to the packet data before the packet is streamed to the upper layer.

In another embodiment, a method for processing packet data received from a lower layer is disclosed. The method includes receiving a packet from the lower layer, and examining packet data contained in the received packet at a first word location. Then, the methods stores an element indicative of information contained in the first word location into a data structure. The data structure is then appended to the received packet before the packet is streamed to the upper layer. The media access layer pre-processes the received packet in-line while streaming packets to an upper layer.

In yet another embodiment, a packet data processor for parsing received packet data in-line with streaming the packet data to an upper layer is disclosed. The packet data processor includes a memory configured to receive executable microcode defining a type of data structure to be built from the received packet data. A pipeline register stage having a plurality of registers for sequentially receiving and temporarily storing words of the received packet data and, each of the plurality of registers in the pipeline register stage are coupled to a pipeline multiplexor that is capable of reading a portion of the words that are temporarily stored in the pipeline register stage. The packet data processor further includes an analyzing computer that is configured to examine the received packet data output from the pipeline multiplexor, and store a element of the received packet data generated by the analyzing computer into a register file. Further, the packet data processor includes an execution logic unit that is configured to receive the executable microcode from the memory. The execution logic unit is preferably designed to control the examination of the received packet by the analyzing computer.

One particular advantage of the present invention is that host CPU interrupts are minimized because each transferred packet is pre-processed by a micro-risc processor that is programmed to build and appended custom data structures to each transferred packet. In this manner, when the CPU receives or transmits a packet, all information that is of interest to the CPU has already been filtered out and appended to the packet in the form of a data structure. Therefore, the host CPU is off loaded from having to parse each and every byte of transferred packet data to locate the particular information that may of interest to a host CPU. It is important to realize that this processing is performed on-the-fly at line rate as packet data is streamed between layers, thereby reducing transmission delays that are typically attributed to host CPU interrupts.

As a further advantage, because the embodiments of the present invention are fully "programmable" and offer substantially improved line-rate performance, the data structure generation and appending processes should be well suited for any bit or byte stream oriented network protocol. As such, it should be understood that the Ethernet advantages of the present invention are equally applicable to other networking protocols, including FDDI, Token Ring, and ATM based networking systems. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

An invention is described for a high speed media access control layer micro-Risc engine that is user programmable to process packet data in-line while streaming packets in or out of the media access control layer core. Also disclosed are methods for user programmable in-line processing (e.g., parsing) of receive and transmit packet data while performing high speed streaming of packet data in or out of the media access control layer. In the following description, numerous specific details are set forth in order to provide a thorough understanding of the present invention. It will be obvious, however, to one skilled in the art, that the present invention may be practiced without some or all of these specific details. In other instances, well known process operations have not been described in detail in order not to unnecessarily obscure the present invention.

1. Media Access Control Architecture

Figure 1A:
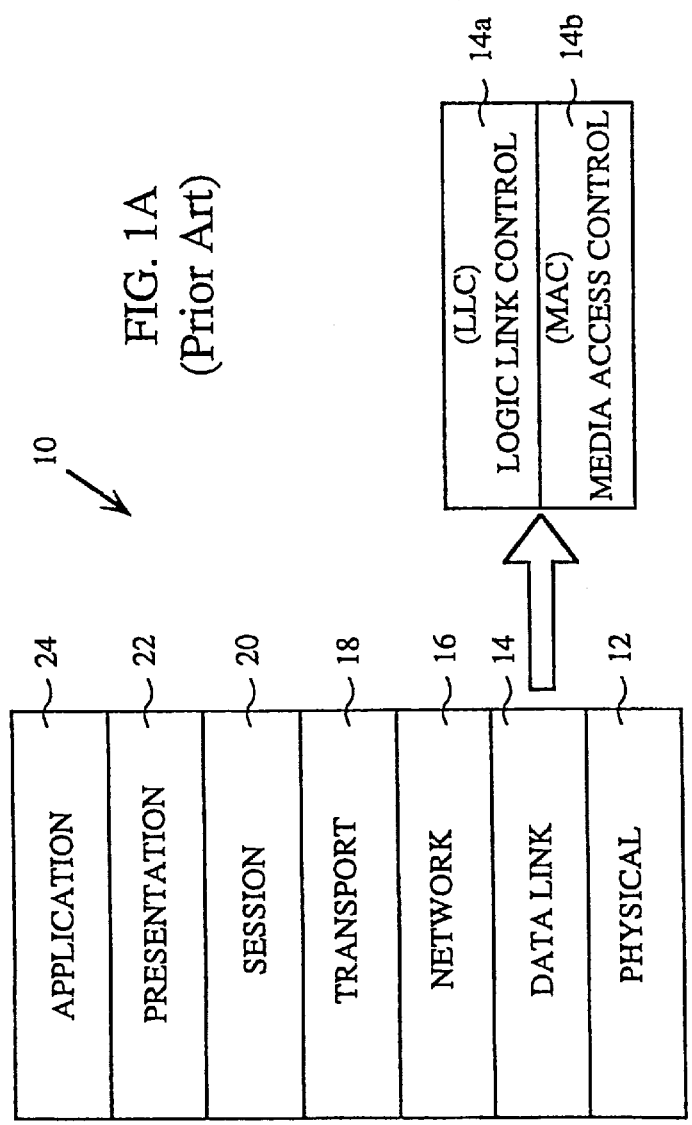
FIG. 1A is a diagrammatic representation of an open systems interconnection (OSI) layered model developed by the International Organization for Standards (ISO) for describing the exchange of information between layers.
Figure 1B:
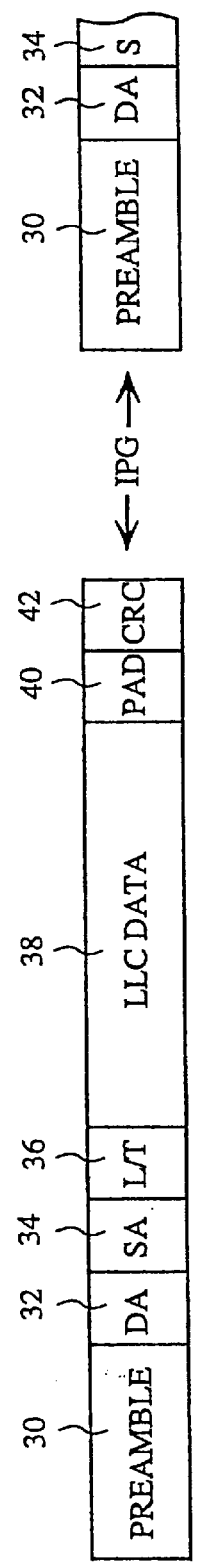
FIG. 1B is a diagrammatic representation of an exemplary Ethernet packet that is conventionally used for transferring data across a network.
Figure 2A:
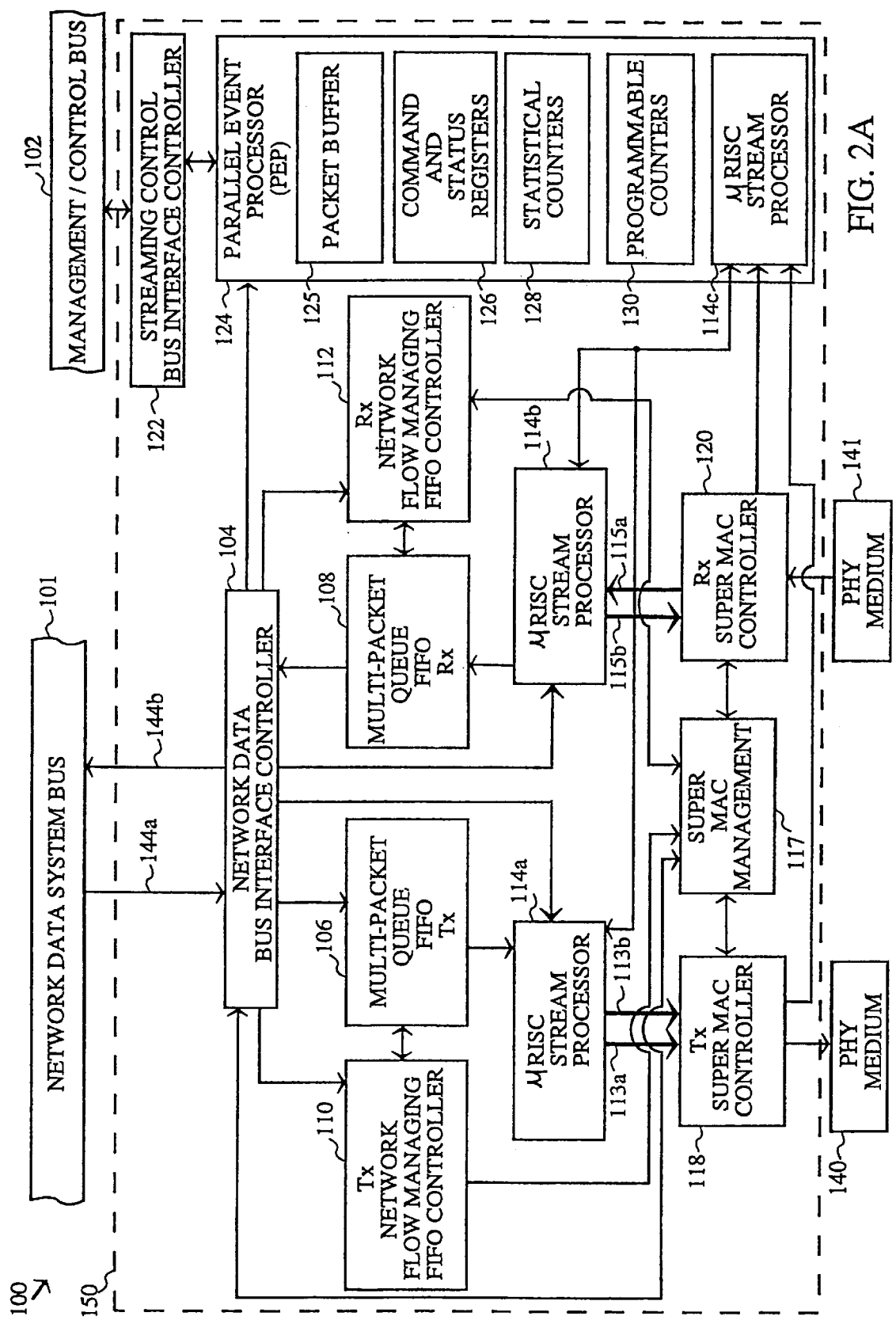
FIG. 2A is an architectural diagram of a flow based media access controller (MAC) for high speed transmissions in accordance with one embodiment of the present invention.

FIG. 2A is an architectural diagram of a flow based media access controller (MAC) 150 for high speed transmissions in accordance with one embodiment of the present invention. In a preferred embodiment, gigabit speed or greater Ethernet transmissions are contemplated. However, it should be appreciated that the architecture is equally applicable to other transmission protocols and both higher and lower speed transmissions. In one embodiment, flow based MAC 150 is a parallel data and control processing architecture. As illustrated in FIG. 2, the flow based MAC 150 interfaces with a network data system bus 101 where both data and control information are processed, and a management/control bus 102 where both control and management data are passed. As data is passed through network data system bus 101 and processed through the various processing blocks of flow based MAC 150, control information may also be simultaneously passed through network data system bus 101. It is important to realize that this type of parallel processing provides the ability to change the processing parameters within flow based MAC 150 at any given time (i.e., even while packet data is being processed).

By way of example, suppose data is being received from an upper LLC layer, and is being processed through various processing blocks where a preamble field and a CRC field are appended to form a packet. Due to the parallel processing nature of flow based MAC 150, control information may be simultaneously passed through network data system bus 101 to modify portions of the packet that has not yet been processed. Accordingly, the parallel processing nature of flow based MAC 150 is capable of passing appropriate control information to alter specific processing parameters even while data is currently being processed.

Referring first to the transmission side, when data is initially received from the upper LLC layer through network data system bus 101, data is transferred to a network data bus interface controller (BIC) 104. In this embodiment, network data BIC 104 may be any suitable interface controller such as a slave interface and a direct memory access (DMA) on-board interface. As shown, a first data/control path 144a and a second data/control path 144b may be used to interconnect network data bus interface 101 to network data BIC 104 when high performance switching tasks are required of flow based MAC 150. By way of example, first data/control path 144a may be used for performing transfers from the upper LLC layer to flow based MAC 150, and second data/control path 144b may be used for performing transfers from flow based MAC 150 to the upper LLC layer. Of course, it is also contemplated that a single bidirectional data/control path may be used by combining 144a and 144b to perform the aforementioned control and data transfers.

Once data is transmitted from network data system bus 101 to network data BIC 104, data may then be appropriately transferred to a multi-packet queue FIFO Tx 106. Generally, FIFO Tx 106 acts as a buffer (e.g., RAM memory) for holding data that is being transmitted from the upper LLC layer through network data system bus 101. In this embodiment, FIFO Tx 106 is preferably capable of storing a large number of packet data. This is a significant improvement over conventional packet FIFO structures that would typically be unable to accommodate greater storage requirements associated with increased throughputs produced by gigabit speed (e.g., +1,000 Mbps) systems in accordance with one embodiment of the present invention.

Once a suitable number of packets are buffered in FIFO Tx 106, a network flow managing FIFO Tx controller 110 is implemented to manage the high speed flow of packets from FIFO Tx 106 into a micro-RISC stream processor 114a. At a higher level, network flow managing FIFO Tx controller 110 may be responsible for prioritizing the different types of data being transferred across a network, such as audio, video, graphics, etc. into a number of linked buffers contained within FIFO Tx 106. In this manner, flow based MAC 150 is capable of having multiple simultaneous streams of data flowing through FIFO Tx 106 at one time. In one feature, when packets are being read out from FIFO Tx 106, any one particular packet may be skipped without reading the entire packet. In another feature, a packet may be re-transmitted from FIFO Tx 106 by holding a given packet for a programmable time. In still another feature, a packet being written into FIFO Tx 106 may be flushed directly out of FIFO Tx 106 before being transmitted to micro-RISC stream processor 114a.

In yet another embodiment, control information may be embedded within packets buffered in FIFO Tx 106. In this manner, the processing parameters may be modifiable in a pipe-lined packet-by-packet basis. By way of example, the embedded control information may contain modifications to the processing parameters as well as identifying information to single out a particular packet for modification. It should be appreciated that having a smart network flow managing FIFO Tx controller 110 also facilities network management and associated testing protocols. Although few circumstances should require the processing parameters to be changed for each successive packet, it will be appreciated that the ability to modify the processing parameters for any given packet in a packet stream is a powerful feature.

Once network flow managing FIFO Tx controller 110 performs any requested processing based on received control information, micro-RISC stream processor 114a is suited to performs various user programmable packet processing, parsing, filtering and encapsulation operations.

By way of example, micro-RISC stream processor 114a operates in an in-line manner for modifying data stream characteristics. Preferably, micro-RISC stream processor 114a (as well as 114b for the receive side) operates on 32 bit-word portions at one time to efficiently process information along flow based MAC 150, while achieving giga-bit speed (and higher) performance. Furthermore, instructions are preferably triggered off of the byte stream. In this embodiment, micro-RISC stream processor 114a is also suited to operate in various addressing modes such as, for example, relative byte count mode.

Internally, micro-RISC stream processor 114a will preferably have a set of general purpose registers, data structure registers, and analyzing computer units. By way of example, the analyzing computer units may include a CRC unit, a compressed hash data unit, an ALU unit, a programmable checksum generator, a CAM, and comparators. Further, micro-RISC stream processor 114a is preferably capable of operating in a conditional, branch, and loop mode, which provides additional flexibility and improved performance. Finally, micro-RISC stream processor 114a processing instructions may include a number of inventive packet field manipulations. Exemplary manipulations may include: CUT, CLEAR, COPY, APPEND, INSERT, AND, OR, XOR, MOVE, JUMP for specialized header generation, separating data and headers, IP_CHKSUM checking and length calculation.

In yet another embodiment, the micro-RISC stream processors of the present invention include an encryption/decryption unit for selectively parsing packets flowing through the micro-RISC stream processors, and thereby providing a user the ability to selectively encrypt and decrypt packets on demand. In this manner, a user can select certain packets that may be sensitive, and thereby prevent forwarding of the packets in an un-protected state. Still further, a compression/decompression unit may be included to selectively increase flow rates over a network. Thus, the compression/decompression may be targeted for certain packets flowing through the micro-RISC stream processors based on the type of application stream (e.g., audio, video, data, etc.). This also enables the application of lossy or lossless compression standards.

Still referring to FIG. 2A, once appropriate data and control information is processed within micro-RISC stream processor 114a, data is transferred via a data path 113a to a SUPERMAC Tx controller 118 which is preferably a state machine configured to process packets received from micro-RISC stream processor 114a and output the processed packets to a physical (PHY) medium 140. For more information on the SUPERMAC Tx controller 118 and the SUPERMAC Rx controller 120 of FIG. 2A, reference may be made to the following related U.S. patent applications: (1) Ser. No. 09596745 (attorney docket no. XAQTP001A), entitled "Media Access Control Architectures And Network Management Systems," (2) Ser. No. 08845563 (attorney docket no. XAQTP002), entitled "Media Access Control Transmitter And Network Management System," and (3) Ser. No. 08845272 (attorney docket no. XAQTP003), entitled "Media Access Control Receiver And Network Management System." These applications are hereby incorporated by reference.

FIG. 2A also shows a SUPERMAC management block 117 that is responsible for interfacing between transmitting SUPERMAC Tx controller 118 and a receiving SUPERMAC Rx controller 120. SUPERMAC management block 117 also interfaces with network flow managing FIFO Tx controller 110, a network flow managing FIFO Rx controller 112, and network data BIC 104. Generally, SUPERMAC management block 117 functions as an interface that receives flow control information, auto negotiation commands, physical management commands, and pause frame information (i.e., pause frames are used by a receiving unit to notify a transmitting unit to cease the transmission of data until a receiving buffer is free).

In this embodiment, SUPERMAC Tx controller 118 and SUPERMAC Rx controller 120 are shown linked to a second micro-RISC stream processor 114c that is preferably contained within a parallel event processor (PEP) 124. In this embodiment, appropriate processing events occurring within SUPERMAC Tx controller 118 and SUPERMAC Rx controller 120 may be transferred to micro-RISC stream processor 114b. In this manner, the processing events occurring within the SUPERMAC Rx and Tx controller may be stored within appropriate statistical counters 128 of PEP 124.

On the receiving side, micro-RISC stream processor 114b is coupled to micro-RISC stream processor 114c in order to monitor and keep track of events being processed in and out of flow based MAC 150. Typically, data is received into flow based MAC 150 through a physical (PHY) medium 141, and then passed to the Rx SUPERMAC controller 120. In one embodiment, SUPERMAC Rx controller 120 is capable of passing received CRC fields or padding fields directly to micro-RISC stream processor 114b without performing a conventional stripping functions. When this happens, stripping functions may be performed by micro-RISC stream processor 114b itself, before passing the received packet data to the upper LLC layer. Once SUPERMAC Rx controller 120 receives an a packet from physical medium 141, the packet is transferred to micro-RISC stream processor 114b for processing and then to a multi-packet queue FIFO Rx 108.

As in the transmitting side, events performed in SUPERMAC Rx controller 120, and micro-RISC stream processor 114b are both linked to micro-RISC stream processor 114c, which accounts for those events in statistical counters 128. Preferably, network flow managing FIFO Rx controller 112 is capable of assigning a number to each of the packets received by FIFO Rx 108. Because FIFO Rx controller 112 is knowledgeable of the numbers assigned to each packet, a control signal may be transferred to FIFO Rx controller 112 requesting that a particular numbered packet stored in FIFO Rx 108 be transferred (i.e., to LLC layer or PEP 124 for management purposes). Once data is transferred out of multi-packet queue FIFO Rx 108 and into network data BIC 104, in a switched environment, data is passed through data path 144b onto network data system bus 101. Of course, a single bidirectional data path may alternatively be used in place of paths 144a and 144b.

It is further noted that the same packet stream passing to FIFO Rx 108 from the micro-RISC stream processor 114b may be simultaneously passed in full duplex mode to the management side micro-RISC stream processor 114c (i.e., port mirroring). In this manner, management tasks may be performed on received packet stream within the PEP 124 while data is transferred to the upper layers.

In this embodiment, streaming BIC 122 is preferably implemented for passing control information and performing data management tasks. By way of example, in performing a network management task, it may be necessary to pull (i.e., filter) a particular packet of information from the path of packets being processed through network data BIC 104. Once the desired packet is identified, it may then be filtered by micro-RISC stream processor 114c that lies within parallel event processor (PEP) 124.

Micro-RISC stream processor 114c is also preferably responsible for programming new events, filtering desired packets and buffering the desired packets in suitable buffers. Further, micro-RISC stream processor 114c is also capable of initiating programmable thresholding, alarm generation, SNMP/RMON packet transmission, generating test frames, and detection of flows for matrix statistics generation. In addition, a basic set of hardwired counters may also be provided to account for various processing operations performed by micro-RISC stream processor 114c.

In this embodiment, network management operations are generally used for determining selected network statistics such as throughput, utilization, number of collisions, traffic flow characteristics, etc. Advantageously, simple network management protocols (SNMP), and remote monitoring (RMON) may also be implemented through PEP 124 of FIG. 2. As is well known in the art, RMON monitoring allows a network manager to analyze various traffic statistics and network parameters for comprehensive network fault diagnostics, planning and performance tuning.

Accordingly, PEP 124 includes an inventive packet buffer 125 for storing appropriate packets that are implemented by the network management protocols such as SNMP and RMON. By way of example, if a user wants to monitor certain packets within the data stream being processed through network data BIC 104, the micro-RISC stream processors 114b and 114c will filter out the desired packets that are subsequently stored in packet buffer 125. Also included within PEP 124 is command and status registers 126, such that the command registers receive associated control signals from management/control bus 102 through streaming control BIC 122. In one embodiment, 114b and 114c may be the same processing entity.

Also shown are statistical counters 128 that are responsible for storing particular events that may be occurring within SUPERMAC Tx controller 118, SUPERMAC management block 117, SUPERMAC Rx controller 120, micro-RISC stream processor 114a, and micro-RISC stream processor 114b. Accordingly, as packets are processed and events occur, the event information is streamed into micro-RISC stream processor 114c and then stored in statistical counters 128. Further, a plurality of programmable counters 130 are provided within PEP 124 for keeping track of new events (i.e., programmable events) that may be undefined at present time, but may be defined at a future date. For example, the new events may be generated by the micro code that a user programs in the micro-RISC 114a, 114b, and 114c.

Figure 2B:
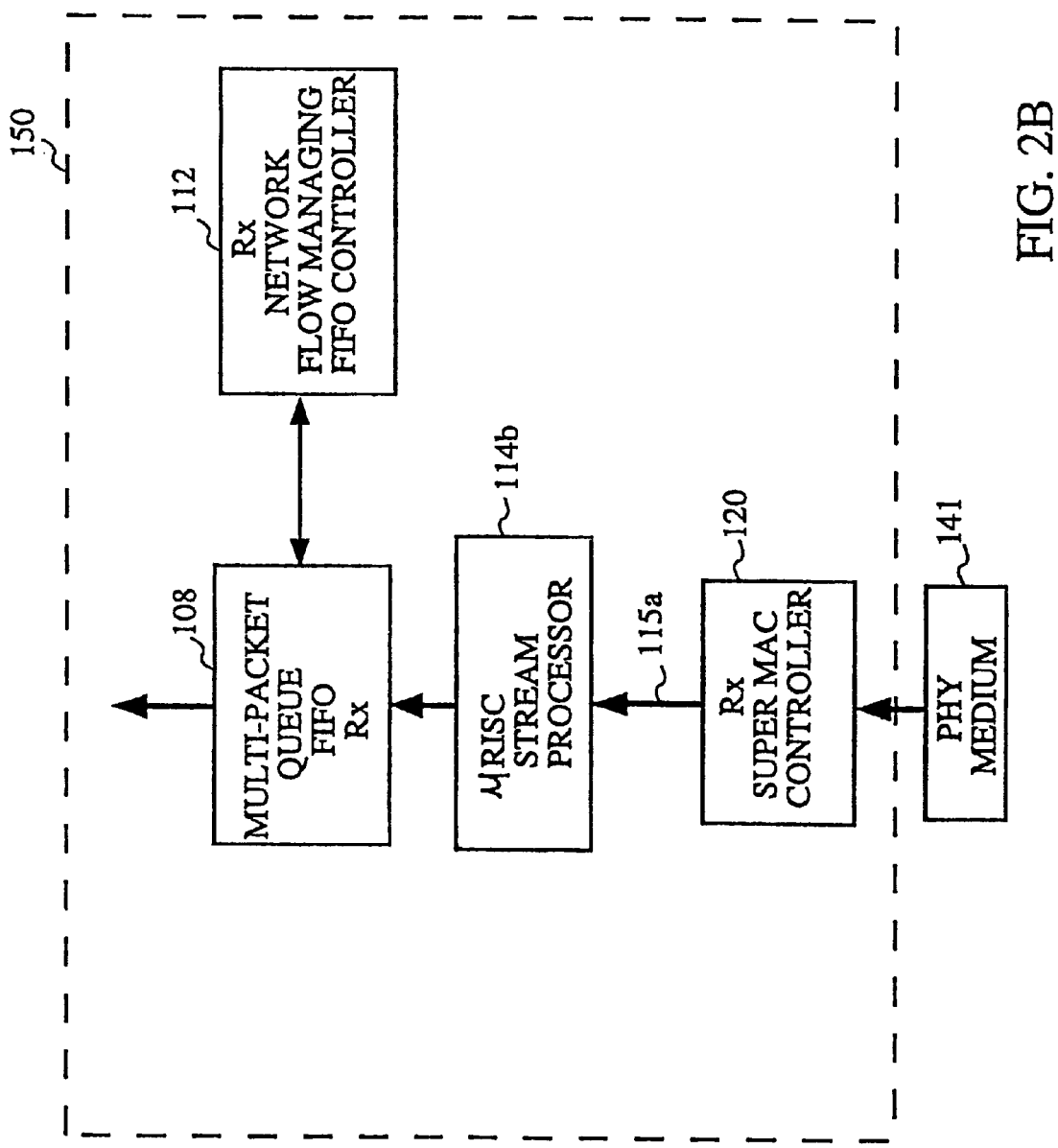
FIG. 2B is a more detailed architectural diagram of a receive micro-RISC stream processor in accordance with one embodiment of the present invention.

FIG. 2B is a more detailed architectural diagram of micro-RISC stream processor 114b that is specifically implemented for receiving packet data from SUPERMAC controller Rx 120 in accordance with one embodiment of the present invention. As described above, packet data is initially introduced into flow based media access controller 150 from physical medium 141, and once user defined processing is performed in micro-RISC stream processor 114b, the processed packet data is transferred to multi-packet FIFO Rx 108, which is in communication with FIFO Rx controller 112. In one embodiment, the processed packet is preferably sorted into a plurality of varying priority buffers contained within multi-packet queue FIFO Rx 108. In this manner, if a particular packet contains time sensitive data, that packet will be placed into a higher priority buffer, and other data that is less time sensitive will be placed in other buffers of varying priorities. In a further embodiment, FIFO Rx controller 112 may be well suited to monitor the traffic intensity being handled by the host CPU. In this manner, when FIFO Rx controller 112 determines that a period of high traffic is being experienced by the host CPU (e.g., a server), the received packets will be temporarily stored in FIFO Rx 108, and then transferred all at once to the upper layers to reduce the number of interrupts experienced by the host CPU.

In one embodiment, micro-RISC stream processor 114b is a user programmable in-line packet processing engine that is capable of rapidly parsing through received packet data to build user defined data structures that may be appended to the beginning of the received packet before being transferred to multi-packet queue FIFO Rx 108. To initialize a user programming operation of micro-RISC stream processor 114b, the user may configure a software instruction set designating the type of parsing to be performed on in-coming packet data, as well as the type of data structure to build and append to respective packets through the use of a graphical user interface (GUI). Once the instruction set is configured, the software instruction set is compiled to executable "microcode" by the host's CPU, and then transferred into hardware memory locations resident in the integrated circuit core of micro-RISC stream processor 114b.

It is important to realize that packet data processing occurring in micro-RISC stream processor 114b rapidly generates the user defined data structures in an in-line manner (i.e., without slowing down data transfer rates) to advantageously append the defined data structures to the packets being streamed to upper layers. When the upper layers receive the packet data having the appended data structures, the upper layers need not scan the entire packet byte-by-byte (or bit-by-bit) tying up CPU bandwidth to identify packet data of interest. This is because the user defined data structure may be programmed to store pointers to portions within the packet data that may be of interest to upper layer protocols, or portions of data (hashed or compressed data) that may be quickly read and processed without having to spend CPU bandwidth to scan and process the entire packet. Once the upper layers receive the compactly coded data structure information, the upper layers may rapidly stream the packet data to its intended destination (e.g., a switch, a router, a client, a server, etc.). In one embodiment, the data structure information may be provided to the host in the form of a "status/descriptor" that is then processed by the host packet processing software.

As described above, the user may program micro-RISC stream processor 114b to generate custom data structures containing, for example, a pointer to the start of an internet protocol (IP) header, a pointer to the start of a transmission control protocol (TCP) header, and a pointer to the start of a simple mail transfer protocol (SMTP) header. Other exemplary data structures may be programmed to include portions of the packet data itself such as an IP destinations address and compressed hashed data. Because the type of data structure and the content of the data structures are fully programmable by the user, other exemplary data structures may include "flag" data structures where each bit is programmed to identify one protocol or another, or "field" data structures where multiple bits are coded to identify different networking protocols.

Figure 2C:
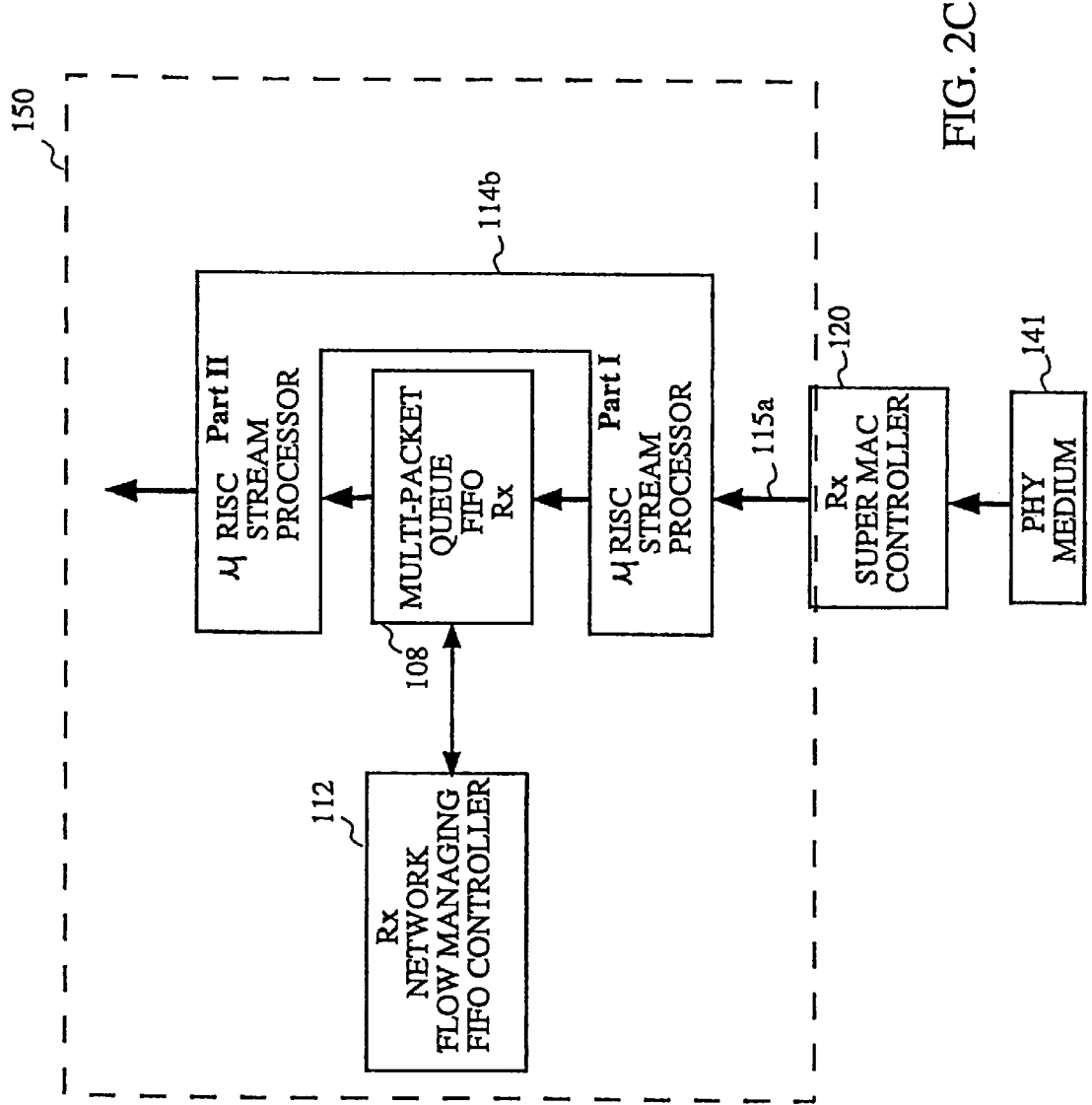
FIG. 2C illustrates an alternative embodiment for the micro-RISC stream processor of FIG. 2B in accordance with one embodiment of the present invention.

FIG. 2C illustrates an alternative embodiment for micro-RISC stream processor 114b in accordance with one embodiment of the present invention. In this embodiment, the hardware logic components of micro-RISC stream processor 114b are divided into a first section (PART I) and a second section (PART II). By splitting micro-RISC stream processor 114b as shown, significant processing power may be achieved because the received packet may be processed in PART I as well as in PART II (i.e., before and after being stored in multi-packet queue FIFO Rx 108).

By way of example, the structural separation provides a built-in "delay" to facilitate processing, such as, packet header modifications, and protocol translation processing. In one embodiment, packet header modification may include packet fragmentation and transformation to convert standard Ethernet packets into an asynchronous transfer mode (ATM) cells. Other packet translation functionalities may include translational bridging between Ethernet, Token Ring and FDDI. The split structure also allows a user to program micro-RISC stream processor 114b to perform a checksum operation after being output from the multi-packet queue FIFO Rx 108.

Because micro-RISC stream processor 114b is a flexible processing unit that may be custom programmed to process in-coming packets in a user defined manner, the split structure of micro-RISC stream processor 114b may be used to perform a number of other user defined tasks that may inherently require internal delays. It should be understood that these minor internal delays in no way slow down the high speed (e.g., gigabit or higher) data transfer rates of flow based MAC 150. On contrary, the internal delays provided by the split structure of FIG. 2C only enhance the processing and data transfer rates by off-loading a host's CPU from having to examine substantial portions of the received packets. Of course, it should be understood that the split architecture of the micro-RISC stream processor may also be implemented in the transmit side for micro-RISC stream processor 114a.

2. Micro-Risc Stream Processor Architecture

Figure 3A:
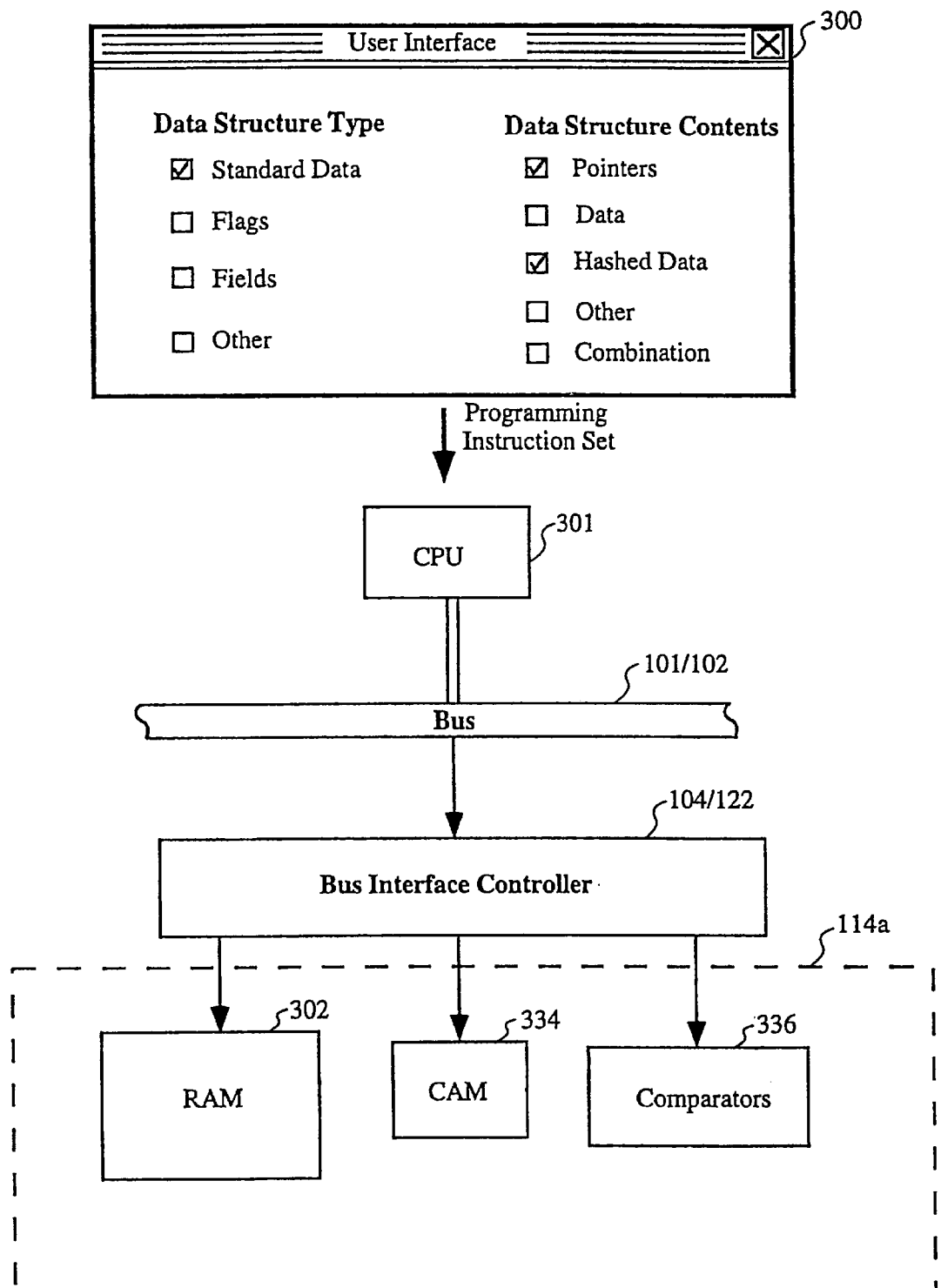
FIG. 3A is a high level block diagram illustrating the preferred interactions between a host CPU and the micro-RISC stream processor of FIGS. 2B and 2C in accordance with one embodiment of the present invention.

FIG. 3A is a high level block diagram illustrating the preferred interactions between a host CPU 300 and micro-RISC stream processor 114b in accordance with one embodiment of the present invention. As described above, because a user is able to program the type of processing to be performed in micro-RISC stream processor 114b, the user is preferably directed to define a software instruction set identifying the type of data structure to build, as well as the content of the data structures. To achieve this, the user preferably implements a graphical user interface (GUI) 300 that provides a list of choices for ease of programming. The GUI 300 generates a software instruction set that is compiled by a CPU 300. The compiled software instruction set is then converted into executable microcode. In one embodiment, the microcode will preferably contain all of the user programmed information identifying the type of data structure to build, and the content of each data structure that will be appended to each packet received by micro-RISC stream processor 114b.

In another embodiment, a protocol descriptive language (PDL) may be used to define a class of protocols using a set of predefined mnemonics with well understood semantics. Example mnemonics may include IP v.4 address, protocol ID, 802.3, and SNAP-encapsulation. These mnemonics may also be combined to from a data structure. A PDL compiler program can then generate the microcode for the Micro-RISC stream processor.

In general, once the microcode for carrying out the processing within micro-RISC stream processor 114b has been executed by the CPU 300, the microcode is transferred to a bus (e.g., 101/102), and then to a bus interface controller (e.g., 104/122) as shown in FIG. 2A above. The bus interface controller then transfers the microcode to hardware storage locations within micro-RISC stream processor 114b. Accordingly, the packet data may be simultaneously (i.e., mirrored) or independently transferred through both or one of the network bus 101 and management bus 102. In one embodiment, a portion of the microcode is transferred into a random access memory (RAM) 302, a portion of the microcode is transferred into a content addressed memory (CAM) 334, and a portion of the microcode is transferred into comparators 336. Once RAM 302, CAM 334 and comparators 336 have received the user programmed microcode, the micro-RISC stream processor 114b will be initialized and ready to receive packet data from SUPERMAC controller Rx 120 as described above.

In this embodiment, RAM 302 is preferably a thirty-two bit wide (or wider) by 256 deep static RAM, which contains an input register on the address input. Accordingly, when an address enable is high, the input register latches the address. Of course any other suitable storage device may be implemented, including a read only memory having pre-programmed microcode instructions or an FPGA. Further, CAM 334 preferably includes a set of sixteen 16-bit registers with equality comparators. In this manner, data to be compared is latched into a register having an output that goes to each of the equality comparators, and flags from the comparator are added together to produce a match signal (matchfound). Still further, CAM 334 may contain a look up table of the sixteen 16-bit entries and, when a match occurs, the corresponding entry is output.

Figure 3B:
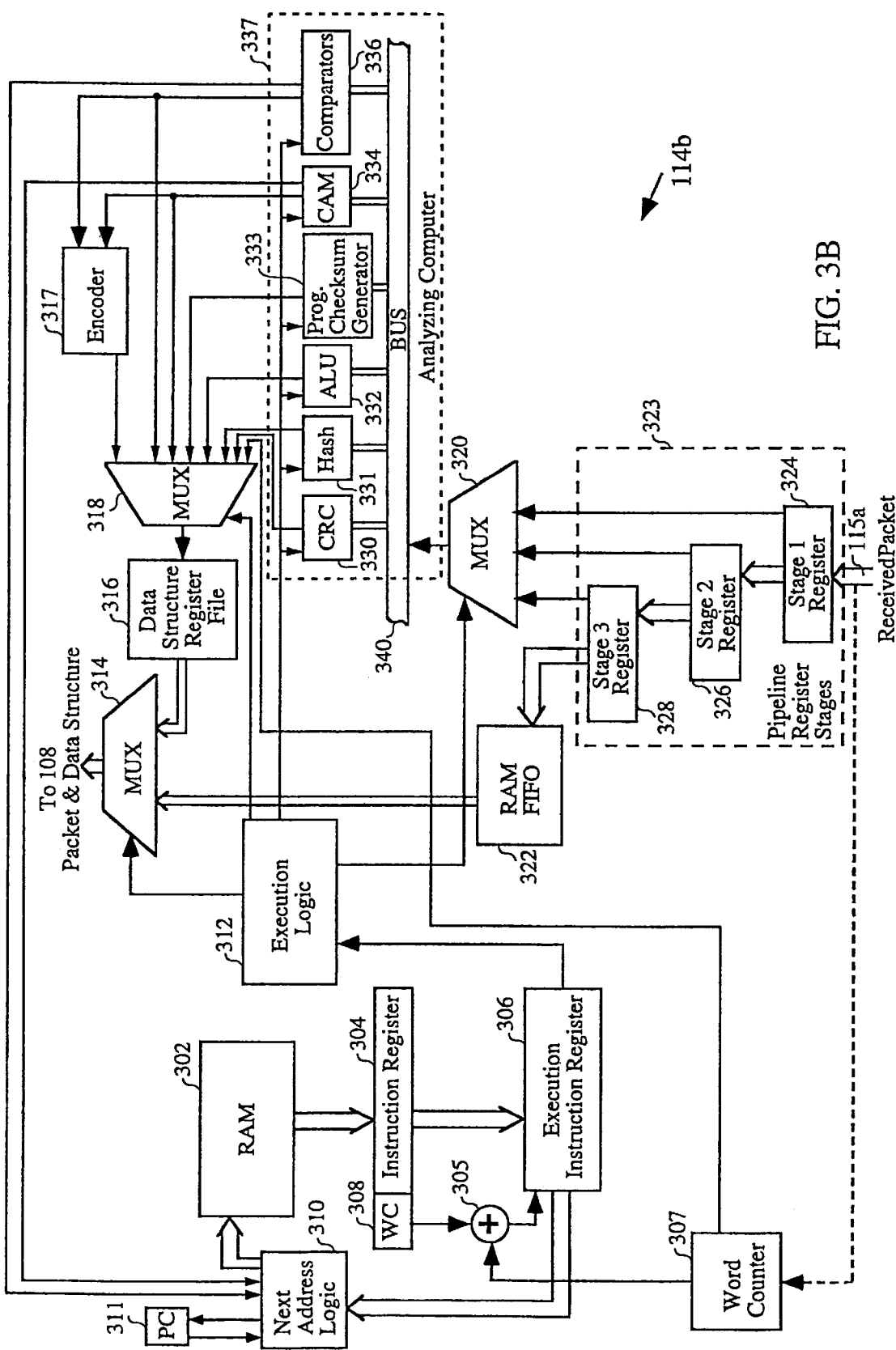
FIG. 3B is an architectural diagram of the preferred hardware units contained within the micro-RISC stream processor of FIGS. 2B and 2C in accordance with one embodiment of the present invention.

FIG. 3B is an architectural diagram of the preferred hardware units contained within micro-RISC stream processor 114b in accordance with one embodiment of the present invention. Assuming that, RAM 302, CAM 334, and comparators 336 have already received the user-defined microcode from CPU 301 as described in FIG. 3A, an initial portion of the microcode contained within RAM 302 is transferred to an instruction register 304. Further, the transferred microcode will preferably contain microcode information to set a word count 308. In this embodiment, the microcode that is resident in word count 308 is configured to identify a desired word count in an in-coming packet.

By way of example, each time a new packet is received by micro-RISC stream processor 114a, a word counter 307 will reset to "0", and then word counter 307 begins sequentially counting each word that is received into pipeline register stages 323 from data path 115a. As shown, pipeline register stages 323 preferably includes a "stage 1" 324, a "stage 2" 326, and a "stage 3" 328 that provides powerful processing capabilities. By way of example, if a stage 1 324 contains the 57th word, stage 2 326 will contain the 56th word, stage 3 328 will contain the 55th word, and a MUX 320 may select portions of the 55th, 56th and 57th word to process at one time. For ease of understanding, the advantages of the pipeline register stages 323 will be described in greater detail below. Of course, it should be understood that any number of pipeline stages may be used.

When a desired word count identified by word count 308 is received into pipeline register stages 323, the microcode initially stored in instruction register 304 will be transferred to an execution instruction register 306. As shown, a summing unit 305 is preferably configured to continuously receive the current word count number from word counter 307, which notifies word count 308 that it is time to transfer the microcode to the execution instruction register 306.

When this happens, the selected word of the in-coming packet has now been stored in stage 1 324 of the pipeline register stages 323. At the same time, the microcode contained within execution instruction register 306 is passed to execution logic 312 which controls the current action of the micro-RISC stream processor 114b. In one embodiment, execution logic 312 communicates with a MUX 320, a MUX 318, a MUX 314, a CRC unit 330, a HASH 331, an arithmetic logic unit (ALU) 332, CAM 334, comparators 336, and a programmable checksum generator 333. As shown, CRC 330, HASH 331, ALU 332, CAM 334, comparators 336, and a programmable checksum generator 333 are part of an analyzing computer 337 that is configured to act on the word of interest (of a current packet) identified by word count 308. As described above, if SUPERMAC Rx controller 120 passes the received packet along with the CRC field, CRC 330 is preferably configured to perform a CRC calculation and strip the CRC field before the packet is transferred to the upper LLC layer. In one embodiment, the CRC calculation is a 32 bit or 16 bit cyclic redundancy check using a generator polynomial.

Based on the execution commands provided by execution logic 312, execution logic 312 instantaneously programs the analyzing computer 337 as well as MUX 320 that selects the identified word stored in stage 1 324, or a portion of the words stored in stage 2 326 and stage 3 328. That is, if portions of words are selected from each stage to construct a new 32-word, MUX 320 will select that new 32-bit word and transfer it to a bus 340. Once the desired word has been transferred to bus 340, the analyzing computer that includes CRC 330, HASH 331, ALU 332, CAM 334, comparators 336, and programmable checksum generator 333 operate on the 32-bit word selected by MUX 320.

If the user desired to create a data structure having a pointer to the currently selected 32-bit word (which may be the start of a header), then the word count will be transferred from word counter 307 to MUX 318 to be input into a current data structure. In this embodiment, the current data structure will preferably be stored in a data structure register file 316. Once all of the data of interest for a current packet has been parsed and stored into the data structure register file 316, the data structure will be appended to the beginning of the packet data being output from MUX 314.

In another example, if the user desires to construct a data structure that includes hashed data (i.e., compressed packet data), the hashed data will be processed in HASH 331 and then passed to MUX 318. Still further, the user may desire that portions (i.e., selected 32-bit words) of the received packet data be placed into the data structure for quick reference by upper layer protocols. Once an entry is made into the current data structure, for the current packet, CAM 334 and comparators 336 generate comparison control signals that are transferred to an encoder 317 and to a next address logic 310. The control information provided to encoder 317 is preferably used to set (i.e., through encoded set bits) the type of data structure the user wants to build, and the control information provided to the next address logic is used to identify the next address from the microcode stored in RAM 302. Thus, based on the comparisons performed in CAM 334 and comparators 336, a branch operation or a move operation will be performed. By way of example, when a branch operation is performed, the next address logic 310 will locate another address location in RAM 302. Further, if a move operation is performed, one of the analyzing computer 337 units will transfer an output to MUX 318 and into data structure register file 316.

In one embodiment, the next address logic 310 contains logic for performing a vectored branch which identifies the next address in the microcode stored in RAM 302 based on the results obtained from the comparator's look up table contained within CAM 334. Further, conditional branching may be used to identify the next address from the microcode itself stored in RAM 302, based on outputs from comparators 337. Still further, Un-conditional branch instructions may come directly from the microcode stored in RAM 302 without analyzing the comparison results generated in CAM 334.

As described above, once CAM 334 and comparators 336 of the analyzing computer 337 have examined the desired 32-bit word, the results of the comparisons are passed to the next address logic 310. In one embodiment, next address logic 310 will ascertain the next address location in the microcode stored in RAM 302 based on information provided from the execution instruction register 306 and the received comparison results received from CAM 334 and comparators 336. Meanwhile, each time a new address is located in RAM 302, that address is stored in a program counter (PC) 311. In this embodiment, the program counter PC 311 will keep track of the most recent address selected in RAM 302. Accordingly, program counter (PC) 311 is continually updated after each access operation into RAM 302.

Once the next location within the microcode contained within RAM 302 is ascertained, that portion of the microcode is again transferred to instruction register 304 and word count 308. Again, word count 308 will contain the next word count of interest within the current packet being received. By way of example, since the last word of interest was word 57, the next exemplary word of interest may be word 88. In this example, word 88 may identify the beginning of a header, the beginning of data to be compressed (e.g., hashed) or the beginning of data to be captured. When word counter 307 reaches the 88th word in the packet, the microcode stored in instruction register 304 is shifted into execution register 306 to enable the executing on the newly received data word that is currently stored in stage 1 324 of the pipeline register stage 323.

Again, the contents of execution instruction register are transferred to execution logic 312 for programming the computation functions of the analyzing computer 337, and multiplexors 320, 314, and 318. As mentioned above, the data structure being built is preferably stored in data structure register file 316 before being passed to MUX 318. Once the entire data structure for a particular packet is stored in register file 316 (i.e., after all of the positions within a current packet have been examined), the actual packet data that was being passed through pipeline register stages 323 is temporarily stored in a RAM FIFO 322. As controlled by execution logic 312, the user programmed data structure is passed into MUX 314 where it is appended to the beginning of the packet data being received from RAM FIFO 322.

MUX 314 then outputs the packet and appended data structure to the multipacket queue FIFO 108 as described above with reference to FIGS. 2A–2C. Once the processing is complete for one packet, the next packet is again analyzed based on the same microcode provided by the user. However, if the user wants to modify the processing set in the software instruction set input through GUI 300 of FIG. 3A, the received packets will be processed in accordance with those new parameters. As noted earlier, the data structures created for each packet may include only pointers to selected locations in the packet, only portions of data from the packet itself, only hashed data from the packet itself, or a combination thereof. Accordingly, micro-RISC stream processor 114b will operate on different packets in accordance with the specific microcode programmed by the user. While such a described architecture is believed to work particularly well, it should be appreciated that similar functionalities can be accomplished using other architectures as well.

As mentioned earlier, when the upper layers receive the packets having the appended data structures, the upper layers may simply read the data they need to complete packet routing without having to examine substantially all of the received packet to locate the information that is of interest to the upper layers. It should be noted that most of the time, each packet may have similar header information (i.e., the IP header) located in different byte locations within a received packet, and therefore, a host's CPU is typically required to laboriously scan through most of the contents of each packet before it can perform any necessary routing or processing. Accordingly, by appending a user defined data structure to the front of a received packet, even greater than gigabit Ethernet transmission speeds may be attained with substantially fewer CPU interrupts.

Figure 4A:
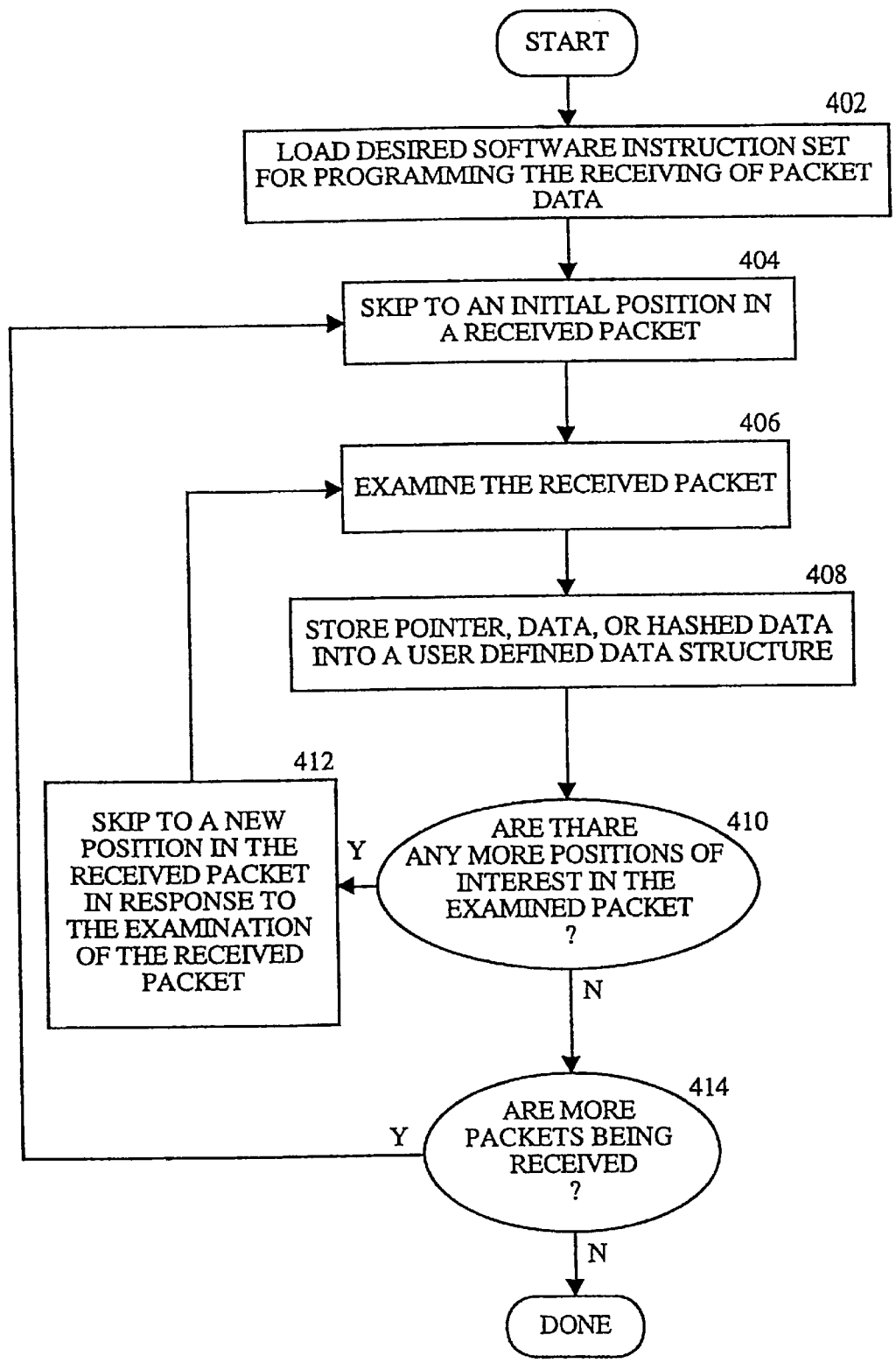
FIG. 4A is an overview flowchart diagram of the preferred processing steps performed within the micro-RISC stream processor of FIGS. 2B and 2C in accordance with one embodiment of the present invention.

FIG. 4A is an overview flowchart diagram of the preferred processing steps performed within micro-RISC stream processor 114b in accordance with one embodiment of the present invention. The method begins at a step 402 where a user defined software instruction set is loaded into micro-RISC stream processor 114b for programming the processing performed on packet data being received from SUPER-MAC controller Rx 120. By way of example, the software instruction set is preferably programmed into a host receiving computer through the use of a graphical user interface (GUI) which prompts the user to define the desired processing on the received packets.

Accordingly, once the user has defined the type of data structures and the word count positions of interest within the received packets for which a data structure will be constructed from, the software instructions set is compiled. In general, the software instructions set is compiled into executable microcode which is then loaded into the RAM 302, CAM 334 and Comparators 336 as described with references to FIG. 3B above. Once the micro-RISC stream processor 114b has received the desired microcode that dictates the type of processing performed on the received packets, the method will proceed to a step 404 where an initial skip will be performed within the received packet. That is, once the packet is received by micro-RISC stream processor 114b, an initial skip into the packet will be performed to determine what type of packet has been received. By way of example, such packets may include proprietary tagged packets, or any other type of packet that may be defined in the future. Generally, the initial skip is ascertained from the MAC layer protocol. Therefore, for Ethernet, the initial skip may have a skipping length of about 12 bytes. Of course, if other protocols are used, such as, for example, Token Ring or FDDI, other initial skipping lengths may be implemented as well.

Once the initial skip has been performed into the received packet, the method will proceed to a step 406 where the received packet is examined by an analyzing computer contained in the micro-RISC stream processor 114b in accordance with the user defined processing instructions provided in the user defined microcode. By way of example, the packet is typically examined to ascertain the word count location of a particular header, or a particular piece of data. Once the analyzing computer computes the desired data to be appended to a data structure, the desired data is passed to a multiplexor.

After the packet has been examined in step 406, the method will proceed to step 408 where the identified pointer, data, or hashed data (or a combination thereof) is stored into the defined data structure. The method will then proceed to a decision step 410 where it is determined if there are any more positions of interest in the examined packet. By way of example, if the microcode determines that there are five separate headers locations of interest, then the method will proceed to a step 412 where micro-RISC stream processor 114a will skip to new position in the received packet in response to the examination of the received packet. In this embodiment, the new skip location will preferably be the location ascertained by the microcode address selected by a next address logic unit contained within micro-RISC stream processor 114b.

Once the micro-RISC stream processor has reached the new position in the received packet, the method will proceed back to step 406 where the received packet is again examined for the new word position identified in the microcode present in word count 308 of FIG. 3B. Once the packet has been examined for this new position in step 406, the method will proceed to step 408 where the pointer, data, or hashed data is once again stored in the defined data structure being built in the aforementioned register file. The method will then proceed again to decision step 410 where it is determined if there are any more positions of interest in the examined packet. Assuming that there are more positions of interest in the examined packet, the method will again proceed through steps 412, 406, 408, and 410 until all positions of interest have been examined and stored in the data structure defined by the user.

When it is determined that there are no more positions of interest in the examined packet (based on the microcode programmed by the user), the method will proceed from decision step 410 to decision step 414. In step 414, it is determined if there are any more packets being received from SUTPERMAC controller Rx 120 as described with reference to FIGS. 2A–2C above. If there are more packets being received by SUPERMAC controller Rx 120, then the method will again proceed to step 404 where an initial skip is performed on the newly received packet. The method will again proceed through steps 406 and 408 where the user programmed data structures are built for the received packet. Of course, if the newly received packet is different from the previous packet, then the processing will be performed in accordance with the programming provided by the user for that new type of packet.

Once the data structure has been built for the newly received packet and all positions of interest in the examined packet have been examined to build the desired data structure, the method will then proceed back to decision step 414. Once it is determined that there are no more packets being received by micro-RISC stream processor 114b from SUPERMAC controller Rx 120, the method will be done. It should be understood that processing for one packet received by micro-RISC stream processor 114b may be completely different than processing for another packet, even if the packets are received in sequential order. Therefore, the data structure built for one packet will many times be different than the data structure built for another packet (e.g. flags, fields, pointers, hashed data, or combination thereof).

Figure 4B:
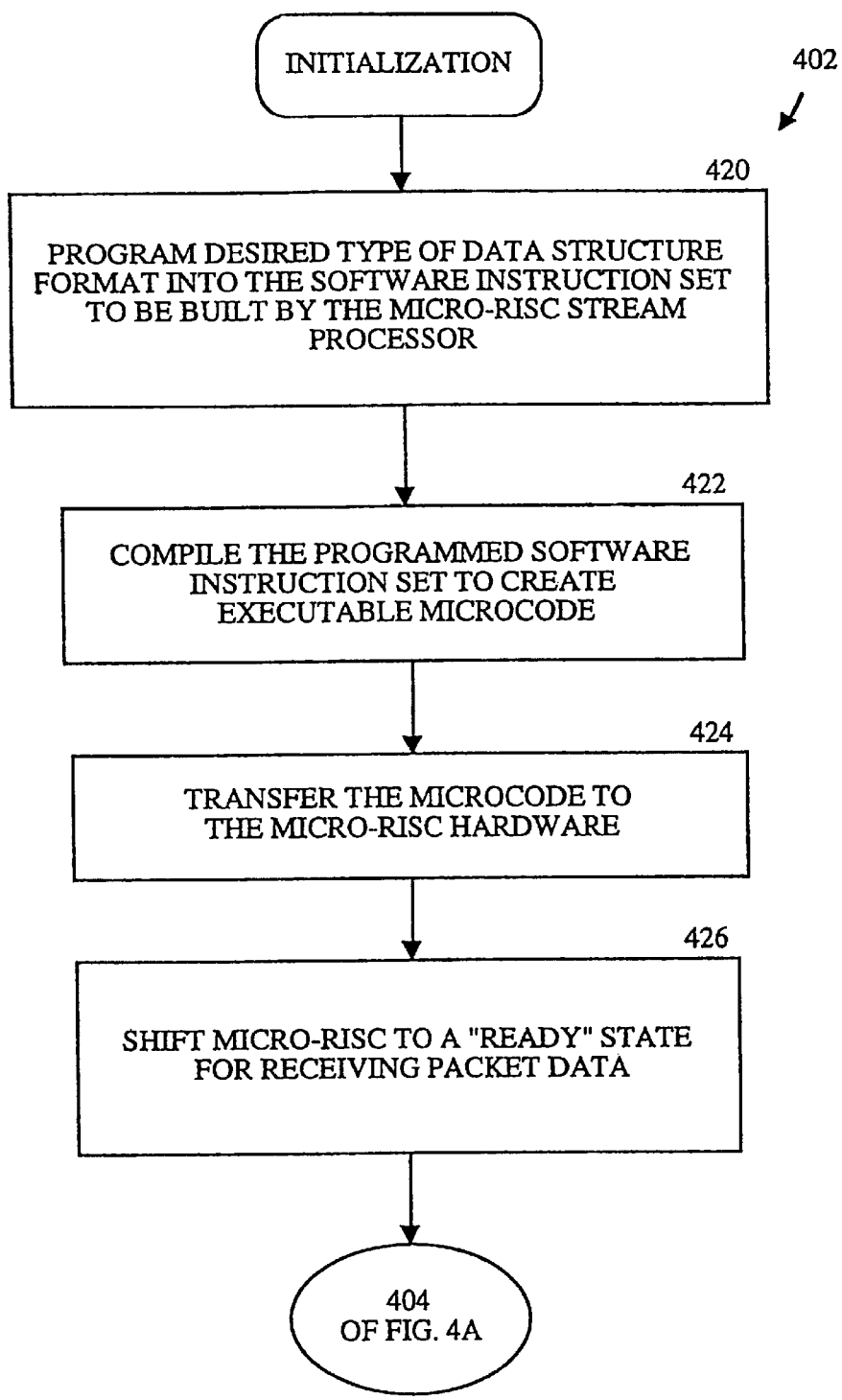
FIG. 4B is a more detailed flowchart diagram illustrating the method steps performed in loading the desired software instructions set for programming the receiving of packet data in accordance with one embodiment of the present invention.

FIG. 4B is a more detailed flowchart diagram illustrating the method steps performed in loading the desired software instructions set for programming the receiving of packet data in accordance with one embodiment of the present invention. In general, FIG. 4B describes the preferred steps for initializing micro-RISC stream processor 114b for the receiving of packet data. The initialization begins at a step 420, where the desired type of data structure format to be built is programmed by the user into the software instructions set. As described above, in a preferred embodiment, the user will preferably program in the desired type of data structure which may be, for example, a pointer data structure, a data structure having portions of packet data, a data structure having hashed data (i.e., compressed), or a combination thereof. The resulting data structure is then appended to the front of a received packet. Of course, if the user desires, the data structure may alternatively be appended to the back of the received packet. In some cases, this may be useful for processing the packet after the entire packet has been read by the upper layer host. As an example, checksum information may be appended to the back of the packet to verify the packet's integrity.

As described above, the user will preferably be provided with a computer graphical user interface for programming the processing carried out by micro-RISC stream processor 114b. However, it should be understood that micro-RISC stream processor 114b may be programmed in any form, such as, for example, through compiled executable microcode that may be transferred over a network. In this manner, the micro-RISC stream processor of remote hosts may be programmed from a remote server computer.

After the user programs in the type of data structure format and the desired positions of interest for the received packets in step 420, the method will proceed to a step 422 where the desired instruction set programmed by the user is compiled to create compiled microcode. In general, the compiled microcode will include the binary information needed by micro-RISC stream processor 114b to process the in-coming packets before they are transferred to multi packet queue FIFO Rx 108.

Once the instruction set has been compiled in step 422, the method will proceed to a step 424 where the compiled microcode is transferred from the host central processing unit (CPU) to hardware contained within micro-RISC stream processor 114b. As described above, micro-RISC stream processor 114b preferably contains a random access memory (RAM), a content addressed memory (CAM) and comparators that are suited to receive a portion of the compiled microcode for processing packets received by the micro-RISC stream processor 114b. The method then proceeds to a step 426 where the micro-RISC stream processor 114b is shifted into a "ready" state for receiving packet data.

At this point, the micro-RISC stream processor has been programmed and initialized to perform the user defined processing on packets that will be received by micro-RISC stream processor 114b. As such, only those data structures defined by the user will be built during the receiving of packets until a modification is made to the microcode transferred to the hardware contained within micro-RISC stream processor 114b.

Figure 4C:
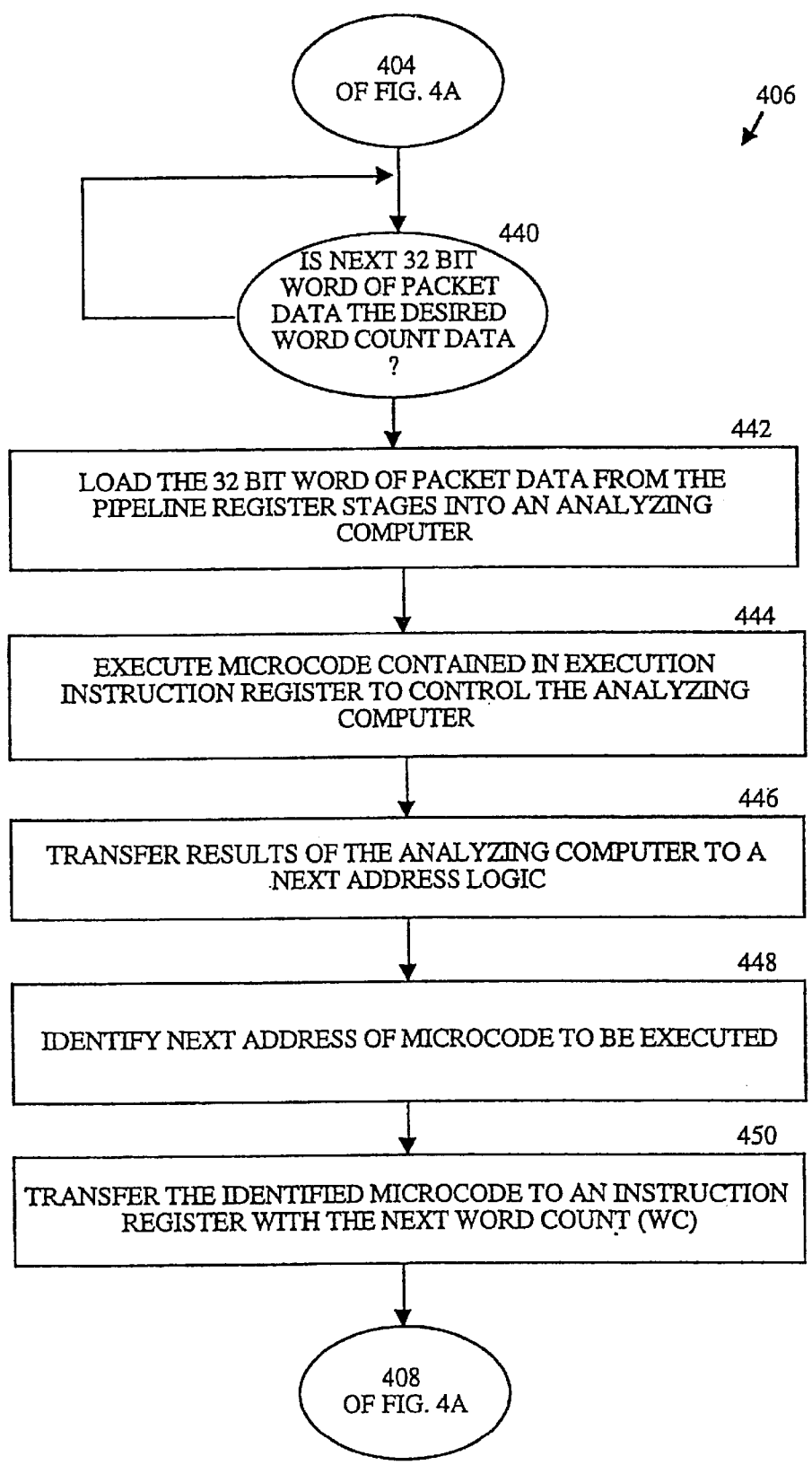
FIG. 4C is a more detailed flowchart diagram illustrating the method steps associated with examining a received packet in accordance with one embodiment of the present invention.

FIG. 4C is a more detailed flow chart diagram illustrating the method steps associated with examining a received packet in accordance with one embodiment of the present invention. The packet examination begins at a step 440 where it is determined if the next 32-bit word of packet data is the desired word count data identified by the user programmed microcode. If the next 32-bit word of packet data is not the desired word count data, then the method will revert back to determine if the next 32-bit word of packet data is the desired word count data. When the desired word count data has been identified, the method will proceed to a step 442 where the desired 32-bit word of the packet data is loaded from a pipeline register stage to an analyzing computer contained within micro-RISC stream processor 114b.

As described above, the analyzing computer preferably contains a CRC unit, a hash unit, an ALU unit, a CAM unit, comparators, an encryption/decryption unit, a compression/decompression unit, and a programmable checksum generator unit. The analyzing computer preferably receives data from a pipeline register stage and then acts upon that 32-bit word data based on control information provided by an execution logic unit. Once the desired 32-bit word has been loaded into the analyzing unit from the pipeline register stage in step 442, the method will proceed to a step 444 where the microcode contained in an execution instruction register is executed by the execution logic to control the processing for the current 32-bit word.

The method will then proceed to a step 446 where comparison results derived in the analyzing computer are transferred to a next address logic unit. The method then proceeds to a step 448 where the next address in the microcode to be executed is identified. Once identified, the next address in the microcode is transferred from the RAM to an instruction register in a step 450 where the microcode sits until a next microcode determined word count in the received packet arrives. When the microcode determined word count in the received packet arrives, the microcode contained in the instruction register is transferred to an execution instruction register. The method now proceeds to step 408 of FIG. 4A where the pointer, data, or hash data is stored into the user defined data structure.

In sum, each time the packet is examined, the micro-RISC stream processor 114b will first ascertain the correct 32-bit word in the packet that is of interest, and then transfer microcode into an execution register to set the processing of the selected 32-bit word that is loaded from the pipeline register stage to the analyzing computer. Each time the analyzing computer processes the selected 32-bit word, an entry is made into a user defined data structure that temporarily stored in a data structure register file. Once the data structure is complete for a given packet being received, the data structure is appended to the leading end of the processed packet. It should be appreciated that all of the described data structure generation is completed in-line while packets are being streamed out of the flow based MAC 150 of FIGS. 2A–2C.

Figure 4D:
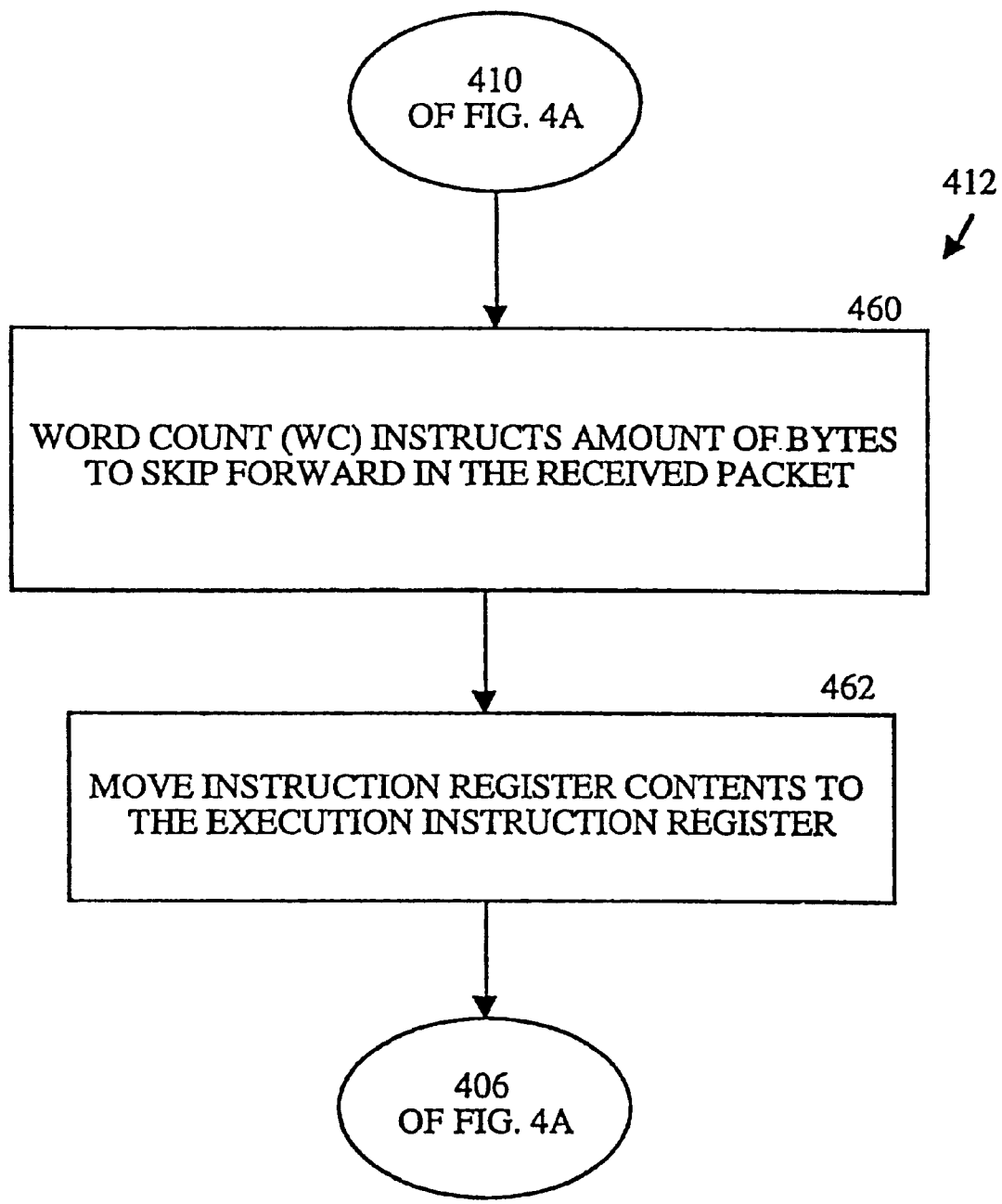
FIG. 4D is a more detailed flowchart describing the processing performed during a skip through the received packet data as described in FIG. 4A in accordance with one embodiment of the present invention.

FIG. 4D is a more detailed flowchart describing the processing performed during a skip through the received packet data performed in step 412 of FIG. 4A in accordance with one embodiment of the present invention. The method begins at step 460 where a word count provided by the microcode provides the micro-RISC stream processor 114a with an amount of bytes to skip forward in the received packet. By way of example, if it is determined that word 52 contains an IP header, and the IP header is a desired position for which the user wants to generate a pointer for the data structure, the micro-RISC stream processor 114a will allow all 32-bit words received up to word 51 to pass before being directed by the execution logic to place a pointer into the data structure for the 52nd word.

Therefore, when the 52nd word of the received packet arrives, the method will proceed to a step 462 where the contents of an instruction register are moved into an execution instruction register which instructs the execution logic to process the received 32-bit word in accordance with the user defined settings. Once the execution instruction register receives the instruction register contents in step 462, the method will proceed to step 406 of FIG. 4A where the received packet is examined as described with reference to FIG. 4C.

Figures 5A, 5B:
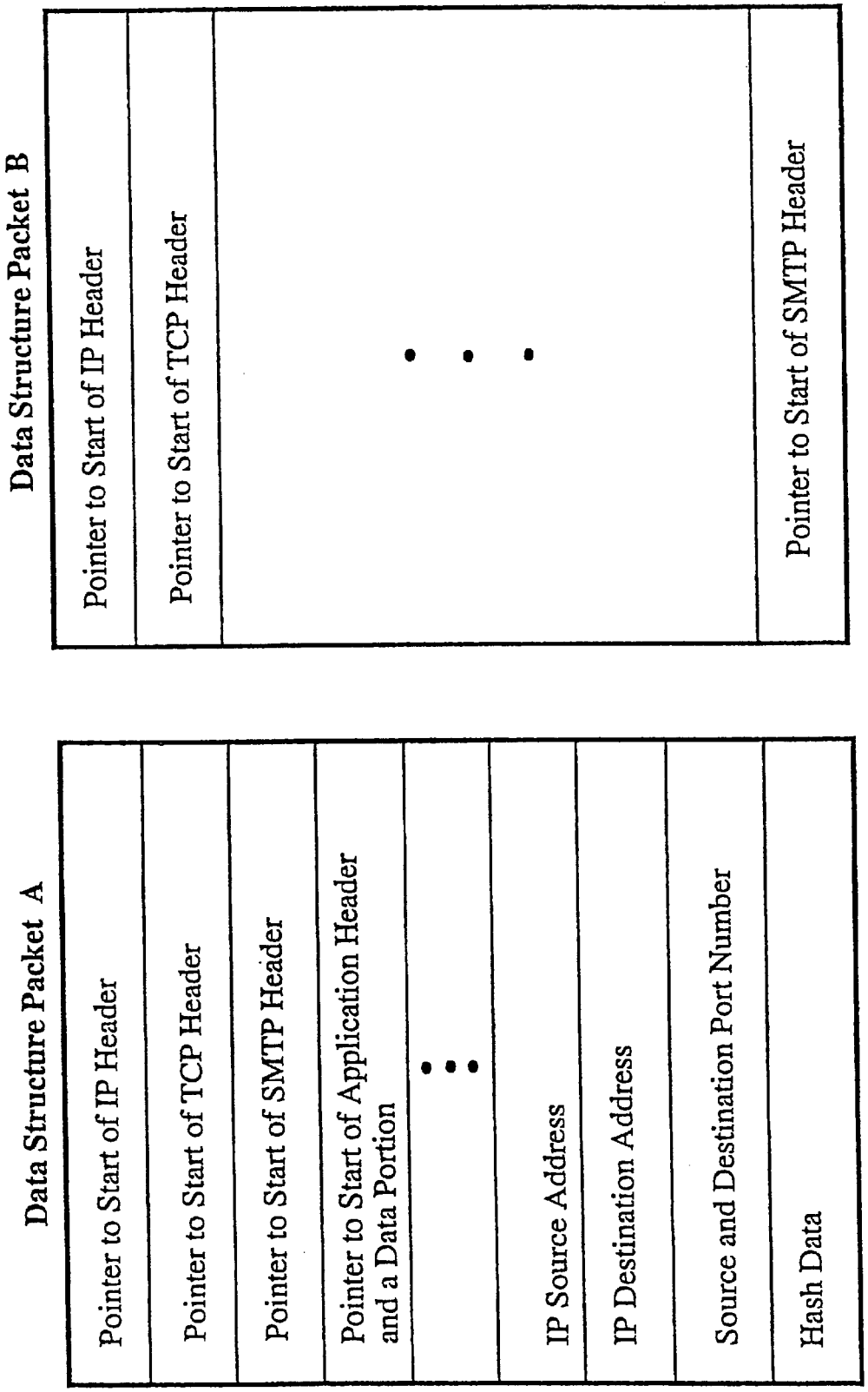
FIGS. 5A through 5E show exemplary data structures which may be programmably created for packets being received by the micro-RISC stream processor of FIGS. 2B and 2C in accordance with one embodiment of the present invention.

FIGS. 5A through 5D show exemplary data structures which may be programmably created for packets being received by micro-RISC stream processor 114b in accordance with one embodiment of the present invention. As shown in FIG. 5A, a user may program a data structure for a packet A to include a pointer to the start of an IP header, a pointer to the start of a TCP header, a pointer to the start of an SMTP header, a pointer to the start of an application header and a data portion. Further, the data structure may include actual packet portions, such as, an IP source address, an IP destination address, a source and destination port number, and hashed data.

Figure 5C:
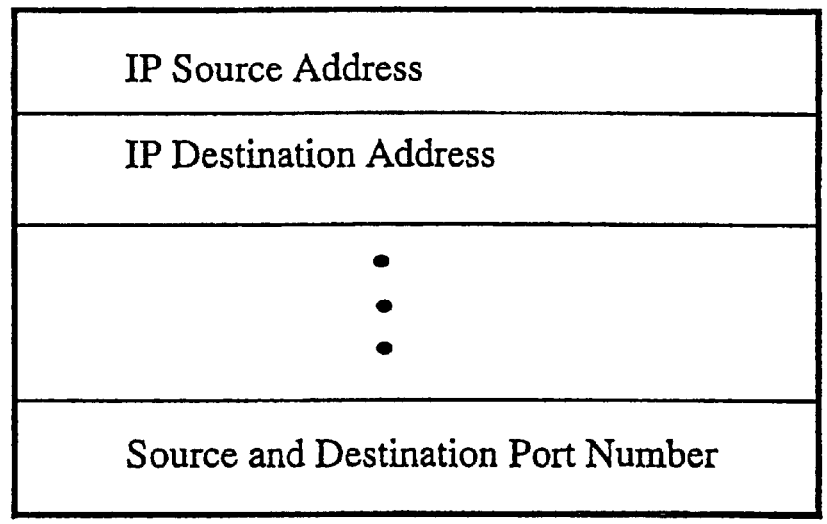
Figure 5D:
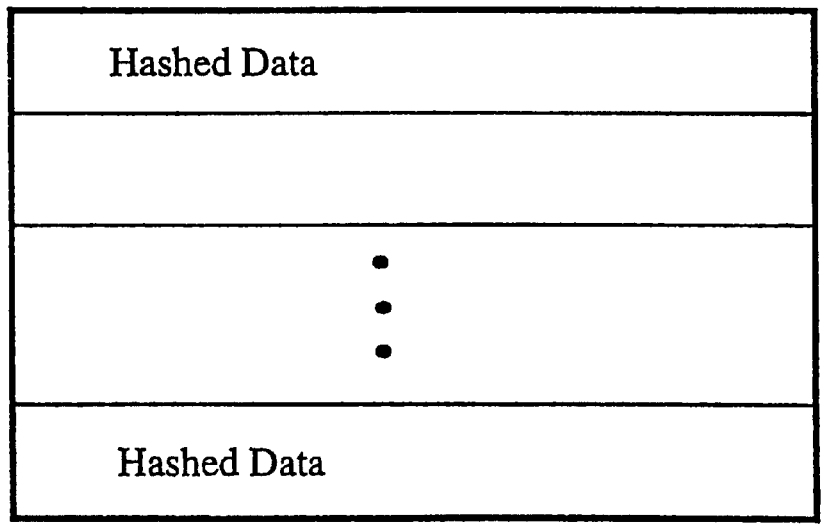

FIG. 5B shows a data structure for a packet B in which only pointers to specific portions of packet B are identified. As such, the user may have a pointer directed to the IP header, a TCP header, an SMTP header and so on. In another example, FIG. 5C shows a data structure having only packet data portions, such as, an IP source address, an IP destination address and a source and destination port number without the inclusion of pointers or hash data. In still another example, FIG. 5D shows a data structure for a packet D that may be programmed to include only hashed data. As is well known in the art, hashed data refers to compression data, which is typically done to reduce processing loads on host CPUs.

Figure 5E:
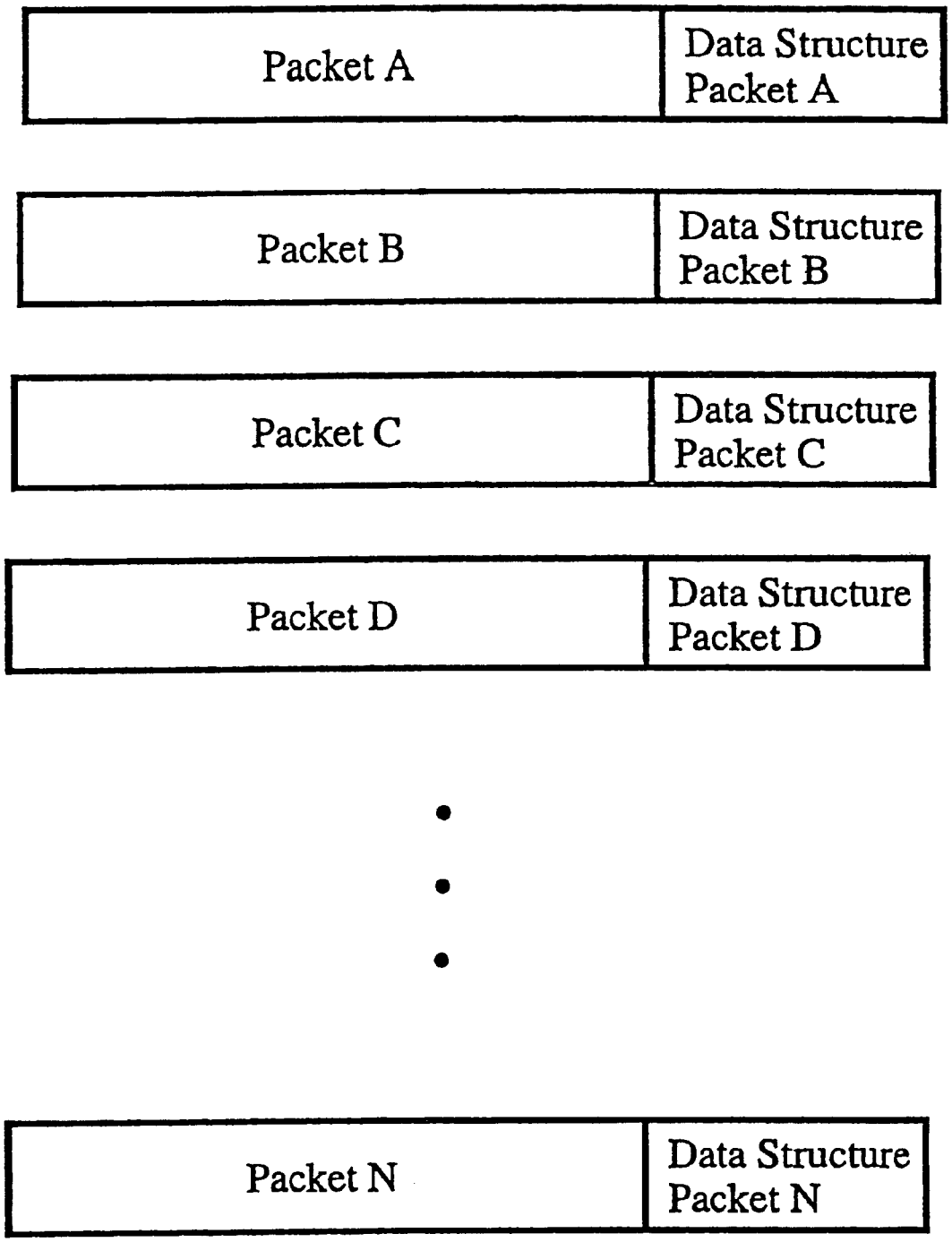

FIG. 5E shows packets A through D having an associated data structure appended to the front of each packet in accordance with one embodiment of the present invention. In general, by providing the information that is of interest to upper layer protocols at the front of the packet, in compact data structure arrangement, a host CPU is no longer required to laboriously scan and search through substantially the whole packet in order to ascertain the location of headers, or data of interest.

Figure 6A:
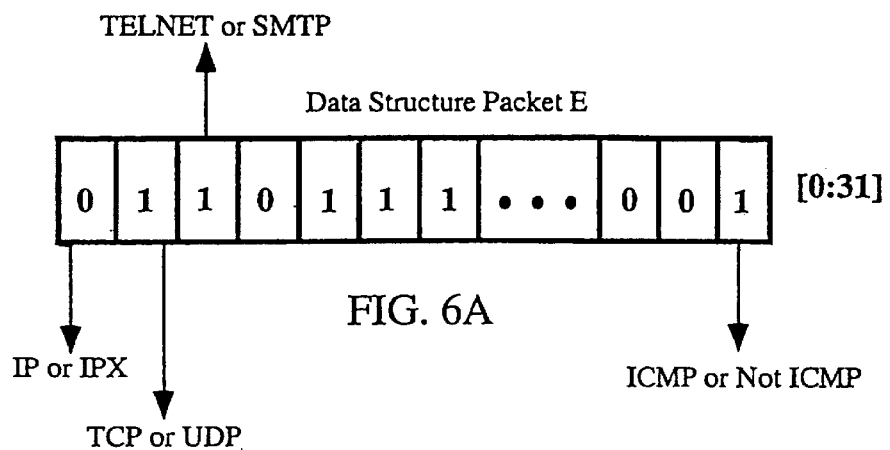
FIGS. 6A and 6B show a data structure for a packet F which has been programmed by a user to include a plurality of flags in accordance with one embodiment of the present invention.

FIG. 6A shows a data structure for a packet F which has been programmed by a user to include a plurality of flags in accordance with one embodiment of the present invention. In one embodiment, the flag data structure is preferably composed of 32 bits which may be used to identify the type of packet or its associated layer protocol. In the example provided, the first flag may be used to determine whether the incoming packet is an IP or an internet packet exchange (IPX) protocol, the second flag may be used to distinguish between a TCP or a user datagram protocol (UDP) protocol, and the third bit may be used to distinguish between a TELNET (i.e., TELNET is a TCP/IP application that enables a user to log in to a remote device) or an SMTP protocol. In another example, the last exemplary flag of the data structure may be used to determine if the packet is an ICMP (i.e., internet control message protocol) or not an ICMP packet.

Figure 6B:
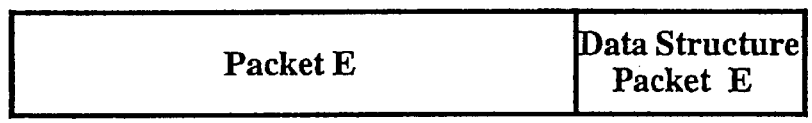

By providing this information up front as part of a data structure, the host CPU will be free from having to laboriously analyze the in-coming packet to determine the location of specific portions of interest. Further, the upper layers such as the application, presentation, session, and transport layers may simply rout the received packet without loading down the host CPU. As shown in FIG. 6B, the flag data structure defined by the user is subsequently appended by the micro-RISC stream processor to the front of packet F before it is passed to the upper LLC layer.

Figure 7A:
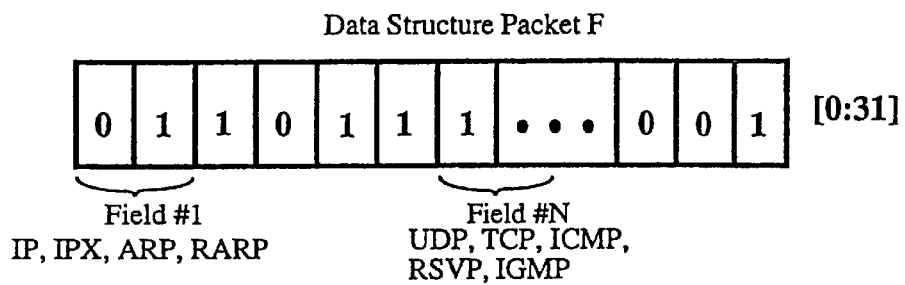
FIGS. 7A and 7B show yet another type of data structure that may be defined by the user in accordance with one embodiment of the present invention.
Figure 7B:
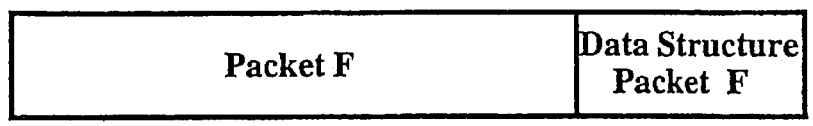

FIGS. 7A and 7B show yet another type of data structure that may be defined by the user in accordance with one embodiment of the present invention. In this example, the data structure may include a plurality of bits grouped into multi-bit fields as shown in FIG. 7A. In this example, field 1 may be a 2-bit field, which may be used to identify the packet as either an IP, IPX, an address resolution protocol (ARP), or a reverse address resolution protocol (RARP). In another example, field N may be a 3-bit field which may be used to identify the packet as a UDP, TCP, ICMP, RSVP, or an internet group management protocol (IGMP) packet. Of course, the field data structure constructed for a packet F may be any number of user defined bit field combinations. It should be understood that the above identified protocol combinations are merely exemplary in nature, and the field data structures may be user programmable to define any present or future protocol, as well as any user defined combination.

As shown in FIG. 7B, the data structure of packet F is now appended to the front of packet F. Again, by having the data structure composed of a plurality of user defined fields, the host CPU is freed from having to scan and search the entire packet to locate the desired information, which may be distributed throughout the packet. It is further noted that not all packets have the information stored in the same locations, and therefore conventional CPUs are required to blindly search through the entire packet to locate the desired information.

3. Transmit Micro-Risc Stream Processor

In a preferred embodiment, micro-RISC stream processor 114a as shown in FIG. 2A includes a number of advantageous packet data processing capabilities. For example, micro-RISC stream processor 114a is preferably well suited to encapsulate out-going packets with various types of headers to improve packet switching, routing, or convert Ethernet packets into ATM cells. It is important to keep in mind that the transmitter micro-RISC stream processor 114a is also configured to process and parse the packet data in line with the streaming out of the packet data, thereby advantageously avoiding latencies in transmissions. Further, because the packet encapsulation and translation operations are completed in the micro-RISC stream processor 114a which lies within flow based MAC 150, a substantial processing burden is lifted from a host CPU, which is advantageously freed from the laborious task of parsing the out-going packet to determine appropriate translations or encapsulations.

Figure 8:
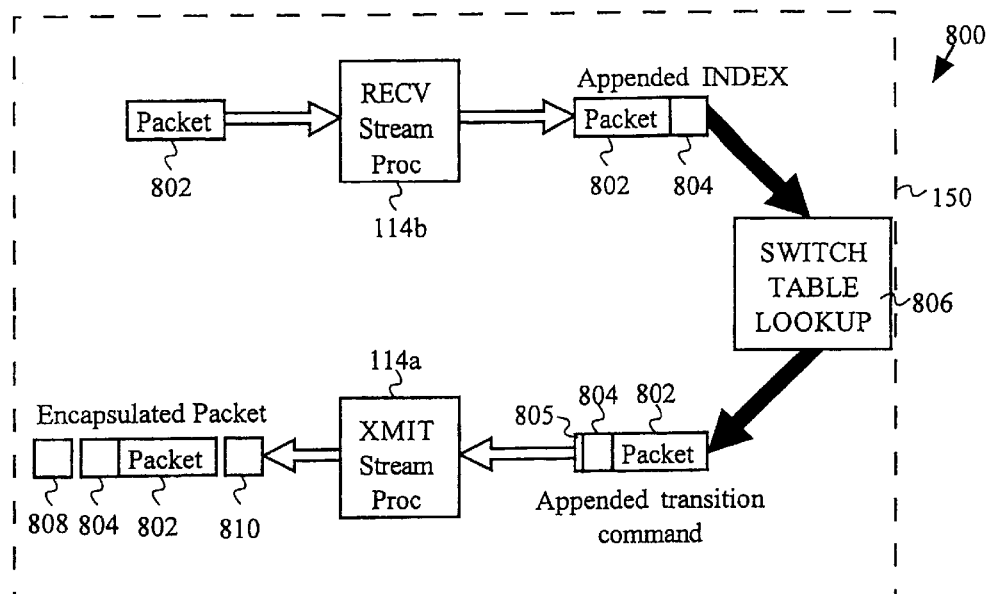
FIG. 8 is a block diagram pictorially illustrating packet processing occurring in the flow based MAC of FIG. 2A during a receive and a transmit operation in accordance with one embodiment of the present invention.

FIG. 8 is a block diagram 800 pictorially illustrating packet processing occurring in flow based MAC 150 during a receive and a transmit operation in accordance with one embodiment of the present invention. As described above, when a packet 802 is received into micro-RISC stream processor 114b, the packet is preferably processed by parsing each 32-bit word in line with streaming packets to an upper layer (or lower layer). As shown, packet 802 is streamed out of micro-RISC stream processor 114b, including an appended index 804 which represents the user-defined data structure having either pointers, data, hash data, or a combination thereof. In this embodiment, the appended index 804, and packet 802 is passed to a switch table lookup 806, which preferably analyzes the routing requirements by reading the information stored in the appended index 804 which includes the quality of service (QoS) associated with the received packet. By way of example, if the packet data just received is an audio packet, this packet may require a higher priority to avoid introducing noise or disruptive skipping delays. On the other hand, if the packet is non-time sensitive data, the received packet will be given a lower priority which, is read from the appended index 804 by the switch table lookup 806. Because this information is conveniently located at the front of packet 802, switch table lookup 806 is able to rapidly ascertain the routing requirements, while employing substantially less host CPU processing (i.e., which may slow down transmission rates).

At this point, packet 802 and appended index 804 is passed into micro-RISC stream processor 114a where the packet data may be processed for transmission out to a remote host (i.e., switch, router, hub, etc.) through the physical layer 140, as shown in FIG. 2A. In this example, the switch table lookup 806 may also append a command header 805 that enables micro-RISC stream processor 114a to determine what type of processing to perform on the packet 802. Once the micro-RISC stream processor 114a uses the command header 805 to create the desired encapsulation headers, the command header 805 will no longer be used. In this embodiment, micro-RISC stream processor 114a is also well suited to attach an encapsulation header 808 at the front of appended index 804 and packet data 802. In addition, micro-RISC stream processor 114a may be programmed to calculate a new cyclic redundancy check (CRC), which may be appended to the back of packet 802 before being transmitted to the remote host.

In one embodiment, encapsulation header 808 may be a virtual local area network (VLAN) header, which is well known to assist networks in filtering traffic based upon complex schemes other than source and destination addresses. In another example, condition based filtering may also be performed by the micro-RISC stream processors. Thus, the VLAN header could empower a network to perform efficient routing based on Ethernet addresses, IP network numbers, or special VLAN designators. In still another embodiment, micro-RISC stream processor 114a may be configured to perform Cisco inter-switch link (ISL) tagging schemes via encapsulation header 808.

Figure 9:
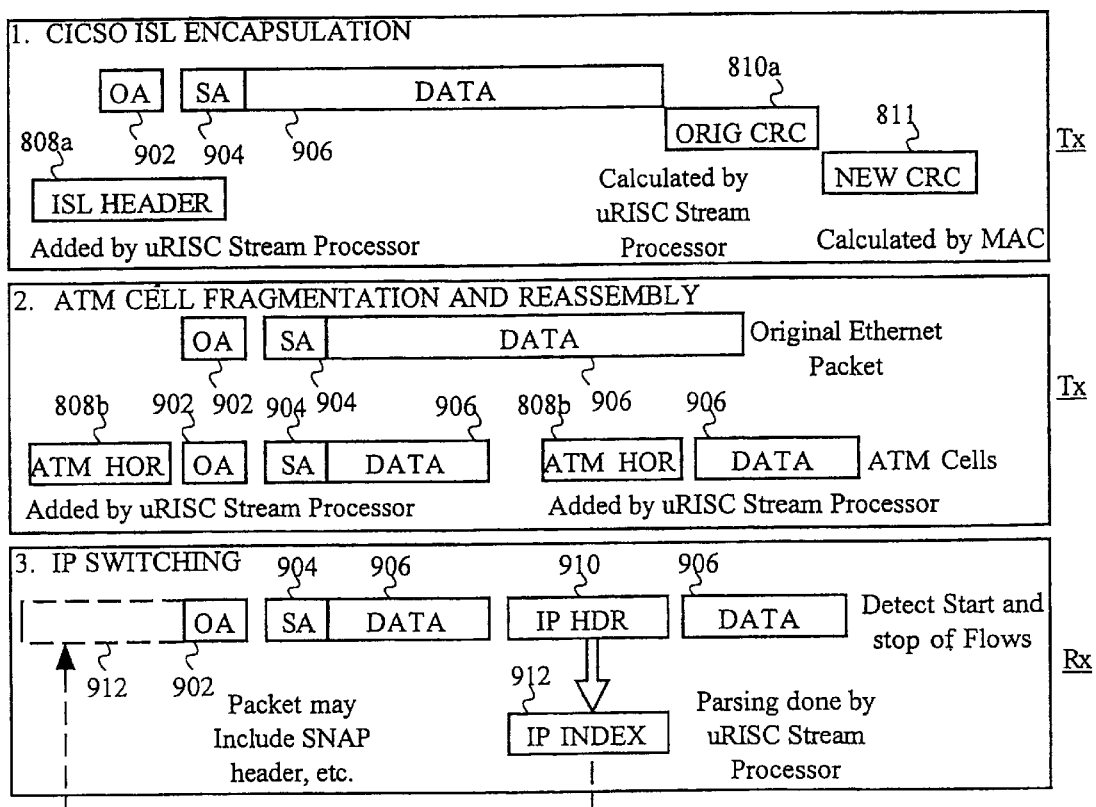
FIG. 9 illustrates a number of functionalities that may be performed within a transmit micro-RISC stream processor in accordance with one embodiment of the present invention.

FIG. 9 illustrates a number of functionalities that may be performed within micro-RISC stream processor 114a in accordance with one embodiment of the present invention. As described above, micro-RISC stream processor 114a may be well suited to provide an encapsulation header 808a, which may be an ISL header used in well known Cisco tagging schemes. Also shown is an original CRC 810a field that may be calculated by micro-RISC stream processor 114a, and appended to out-going packets (in-line). Also shown is an additional new CRC 811 which may be appended to the out-going packet in SuperMAC controller Tx 118 before being transmitted to the physical medium 140, as described above.

In the next example, micro-RISC stream processor 114a may be well suited to perform ATM cell fragmentation and reassembly tasks. By way of example, when micro-RISC stream processor 114a receives an original Ethernet packet containing a destination address (DA) 902, a source address (SA) 904, and data 906, a fragmentation and reassemble operation may be performed on data 906, source address 904, and destination address 902. Once fragmented, an ATM header 808b may be appended to the front of the ATM cell. Because ATM cells are generally of a fixed size, the remaining data that was not appended to the first out-going ATM cell, will be appended to the following ATM cell which is also assembled with its own ATM header 808b.

In still another example, micro-RISC stream processor 114b may be well suited for performing IP switching, wherein an IP header 910 is parsed and indexed with an IP index 912, which is appended to the front of the packet. In this embodiment, micro-RISC stream processor 114a is preferably well suited to generate IP index 912 and compress it through a suitable hashing operation. Therefore, for IP switching, the index is a combination of the source and destination ports and the source and destination MAC addresses, and in some cases, parts of the IP header itself. In this manner, a small width index (12 bits for IP switching), may be used to tag all frames and to switch frames. As a further embodiment, the micro-RISC stream processors of the described embodiments may also be useful in performing IP fragmentation and IP reassembly to reduce the load on a host's CPU. In yet another embodiment, IP checksum functions may also be performed within the various embodiments of the micro-RISC stream processors described herein.

As used herein, reference to the IEEE 802.3 standard shall be understood to include all current IEEE 802.3 standards, including: (a) IEEE 802.3u standard (100 Mbps-Fast Ethernet) IEEE std 802.3u-1995; (b) IEEE 802.3z—working group draft—proposed for standard (1000 Mbps-Gigabit Ethernet); (c) ISO/IEC 8802-3, ANSI/IEEE Std 802.3 (fifth edition 1996); and (d) 802.1D Bridging Standard. All above identified standards are hereby incorporated by reference.

The present invention may be implemented using any type of integrated circuit logic or software driven computer-implemented operations. By way of example, a hardware description language (HDL) based design and synthesis program may be used to design the silicon-level circuitry necessary to appropriately perform the data and control operations in accordance with one embodiment of the present invention. By way of example, a VHDL® hardware description language based on standard available from IEEE of New York, N.Y. may be used to design an appropriate silicon-level layout. Although any suitable design tool may be used, another layout tool may include a hardware description language "Verilog®" tool available from Cadence Design Systems, Inc. of Santa Clara, Calif.

The invention may also employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 10:
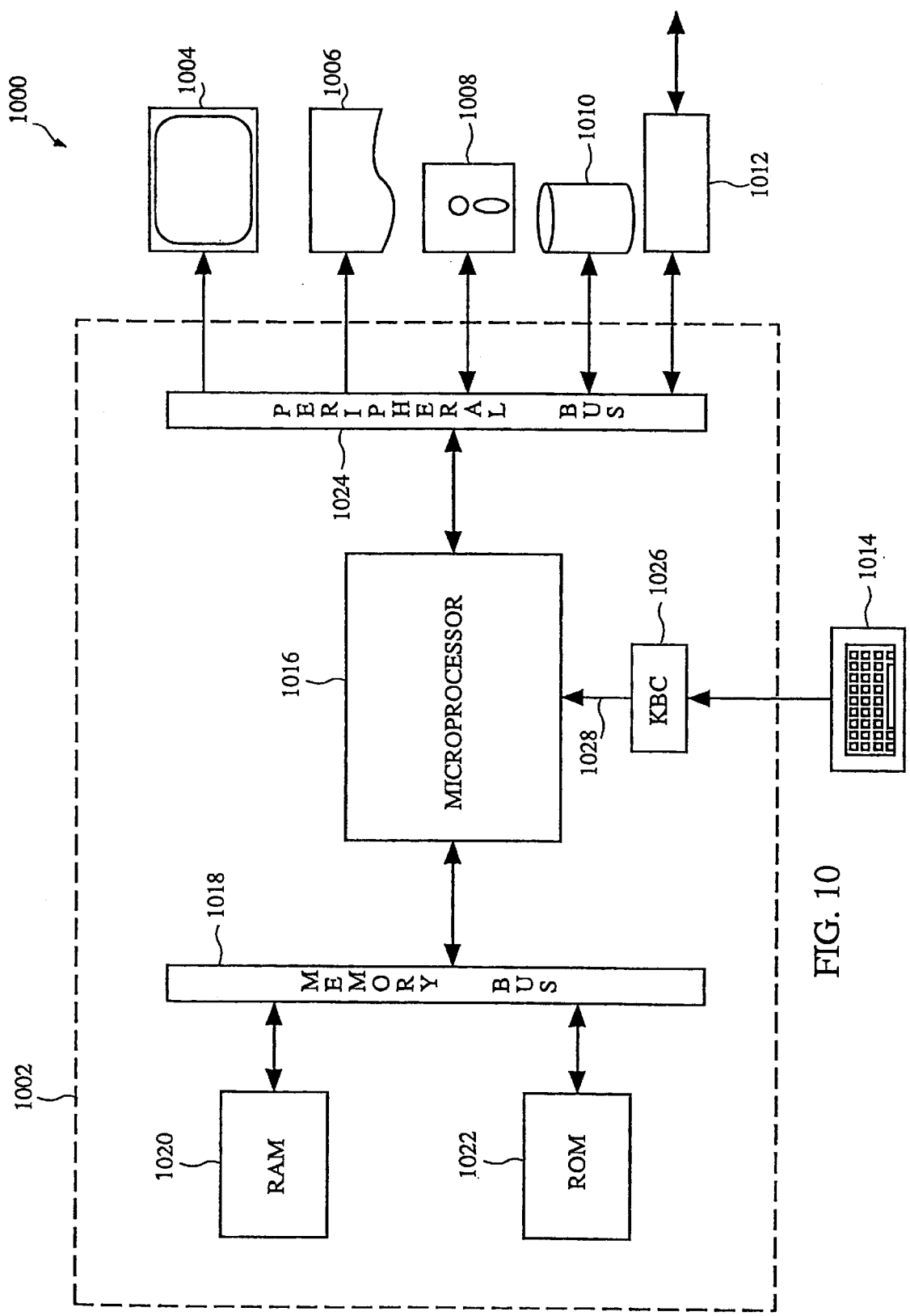
FIG. 10 is a block diagram of an exemplary computer system for carrying out the processing according to the invention.

FIG. 10 is a block diagram of an exemplary computer system 1000 for carrying out the processing according to the invention. The computer system 1000 includes a digital computer 1002, a display screen (or monitor) 1004, a printer 1006, a floppy disk drive 1008, a hard disk drive 1010, a network interface 1012, and a keyboard 1014. The digital computer 1002 includes a microprocessor 1016, a memory bus 1018, random access memory (RAM) 1020, read only memory (ROM) 1022, a peripheral bus 1024, and a keyboard controller 1026. The digital computer 1000 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 1016 is a general purpose digital processor which controls the operation of the computer system 1000. The microprocessor 1016 can be a single-chip processor or can be implemented with multiple components. Using instructions retrieved from memory, the microprocessor 1016 controls the reception and manipulation of input data and the output and display of data on output devices. According to the invention, a particular function of microprocessor 1016 is to assist in the packet processing and network management tasks.

The memory bus 1018 is used by the microprocessor 1016 to access the RAM 1020 and the ROM 1022. The RAM 1020 is used by the microprocessor 1016 as a general storage area and as scratch-pad memory, and can also be used to store input data and processed data. The ROM 1022 can be used to store instructions or program code followed by the microprocessor 1016 as well as other data.

The peripheral bus 1024 is used to access the input, output, and storage devices used by the digital computer 1002. In the described embodiment, these devices include the display screen 1004, the printer device 1006, the floppy disk drive 1008, the hard disk drive 1010, and the network interface 1012. The keyboard controller 1026 is used to receive input from keyboard 1014 and send decoded symbols for each pressed key to microprocessor 1016 over bus 1028.

The display screen 1004 is an output device that displays images of data provided by the microprocessor 1016 via the peripheral bus 1024 or provided by other components in the computer system 1000. The printer device 1006 when operating as a printer provides an image on a sheet of paper or a similar surface. Other output devices such as a plotter, typesetter, etc. can be used in place of, or in addition to, the printer device 1006.

The floppy disk drive 1008 and the hard disk drive 1010 can be used to store various types of data. The floppy disk drive 1008 facilitates transporting such data to other computer systems, and hard disk drive 1010 permits fast access to large amounts of stored data.

The microprocessor 1016 together with an operating system operate to execute computer code and produce and use data. The computer code and data may reside on the RAM 1020, the ROM 1022, or the hard disk drive 1020. The computer code and data could also reside on a removable program medium and loaded or installed onto the computer system 1000 when needed. Removable program mediums include, for example, CD-ROM, PC-CARD, floppy disk and magnetic tape.

The network interface 1012 is used to send and receive data over a network connected to other computer systems. An interface card or similar device and appropriate software implemented by the microprocessor 1016 can be used to connect the computer system 1000 to an existing network and transfer data according to standard protocols.

The keyboard 1014 is used by a user to input commands and other instructions to the computer system 1000. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. It should be understood that the various processing functions described above may be implemented both in silicon as hardware integrated circuits, packaged application specific integrated circuits (ASICs), or as software code (e.g., C and C++ programming code) that may be stored and retrieved from any suitable storage medium. By way of example, such storage mediums may include a disk drive, a hard drive, a floppy disk, a server computer, a remotely networked computer, etc.

In addition, it should be understood that the above described features and functionalities are fully downward compatible to 10 Mbps Ethernet systems and 100 Mbps fast Ethernet systems and associated Asynchronous Transfer Mode (ATM) systems, FDDI, Token Ring or any "streams" oriented communication system (e.g., T1/DS1, SONET, etc.). Of course, above described embodiments also apply to switched, and non-switched, and full/half duplex network systems. Accordingly, the present embodiments are to be considered as illustrative and not restrictive, and the invention is not to be limited to the details given herein, but may be modified within the scope and equivalents of the appended claims.

What is claimed is:

1. A method for processing packet data received from a physical layer, the processing being performed in-line while streaming packets to an upper layer, comprising:
   (a) loading an instruction set for custom programming the processing of packet data received from the physical layer;
   (b) determining a type of packet data received from the physical layer;
   (c) identifying a first word location in the packet data based on the instruction set;
   (d) examining the packet data received from the physical layer at the first identified word location;
   (e) storing an element indicative of information contained in the first identified word location into a data structure; and
   (f) appending the data structure to the packet data before the packet is streamed to the upper layer.

2. A method for processing packet data received from a physical layer as recited in claim 1, wherein the examining the packet data further includes:
   (g) identifying a second word location in the packet data based on a result of the examination of the first identified word location and on the instruction set.

3. A method for processing packet data received from a physical layer as recited in claim 1, further comprising:
   (h) examining the identified second word location in the packet data;
   (i) storing second element indicative of information contained in the identified second word location into the data structure; and
   (j) appending the data structure containing the first stored element and the second stored element to the packet data before the packet data is streamed to the upper layer.

4. A method for processing packet data received from a physical layer as recited in claim 2, further comprising:
   repeating (g) through (j) for additional word locations.

5. A method for processing packet data received from a physical layer as recited in claim 1, wherein the instruction set for custom programming processing of packet data received from the physical layer includes information identifying a type of data structure and a plurality of word locations of interest within the packet data.

6. A method for processing packet data received from a physical layer as recited in claim 5, wherein the type of data structure is selected from the group consisting of a pointer data structure, a packet data segment data structure, a hashed data segment data structure, a flag data structure, and a field data structure.

7. A method for processing packet data received from a physical layer as cited in claim 6, wherein the stored element takes the form of a flag to be stored in the lag data structure.

8. A method for processing packet data received from a physical layer as recited in claim 6, wherein the stored element takes the form of a pointer to be stored in he pointer data structure.

9. A method for processing packet data received from a physical layer as recited in claim 6, wherein the stored element takes the form of a compressed data to be stored in the hashed data segment data structure.

10. A method for processing packet data received from a physical layer as recited in claim 1, wherein the packet data processing is performed by a media access controller layer that communicates with a logic link control layer.

11. A method for processing packet data received from a physical layer as recited in claim 1, wherein the packet data together with the appended data structure are passed directly or indirectly to an application layer.

12. A method for processing packet data received from a physical layer as recited in claim 1, wherein the packet data together with the appended data structure are passed to one selected from the group consisting of logical link layer, a network layer, a transport layer, a session layer, a presentation layer and an application layer.

13. A method for processing packet data received from a lower layer, the processing being performed by a media access layer in-line while streaming packets to an upper layer, comprising:
   (a) receiving a packet from the lower layer;
   (b) examining packet data within the received packet at a first word location;
   (c) storing an element indicative of information contained in the first word location into a data structure; and
   (d) appending the data structure to the received packet before the packet is streamed to the upper layer;
   (e) whereby the media access layer pre-processes the received packet in-line while streaming packets to an upper layer.

14. A method for processing packet data received from a lower layer as recited in claim 13, wherein the examining the packet data further includes:
   (f) identifying a second word location in the packet data based on a result of the examination of the first identified word location and microcode instructions.

15. A method for processing packet data received from a lower layer as recited in claim 14, further comprising:
   (g) examining the identified second word location in the packet data;
   (h) storing a second element indicative of information contained in the identified second word location into the data structure; and
   (i) appending the data structure containing the first stored element and the second stored element to the packet data before the packet data is streamed to the upper layer.

16. A method for processing packet data received from a lower layer as recited in claim 14, further comprising:
   repeating (f) through (i) for additional word locations.

17. A method for processing packet data received from a lower layer as recited in claim 14, wherein the microcode instructions predetermine the data structure to be one selected from the group consisting of a pointer data structure, a packet parts data structure; a hashed packet parts data structure, a flag data structure and a field data structure.

18. A method for processing packet data received from a lower layer as recited in claim 17, wherein the element is a flag bit to be stored in the flag data structure.

19. A method for processing packet data received from a lower layer as recited in claim 17, wherein the element is a data part to be stored in the packet parts data structure.

20. A method for processing packet data received from a lower layer as recited in claim 17, wherein the element is a multi-bit combination to be stored in the field data structure.

21. A method for processing packet data received from a lower layer as recited in claim 17, wherein the element is a pointer to a header to be stored in the pointer data structure.

22. A method for processing packet data received from a lower layer as recited in claim 17, wherein the element is compressed data to be stored in the hashed packet parts data structure.

23. A method for processing packet data received from a lower layer as recited in claim 17, wherein the data structure is built in a register file before being appended to the received packet that is streamed to the upper layer.

24. A method for processing packet data received from a lower layer as recited in claim 13, wherein the packet data processing is performed by a media access controller layer that communicates with a logic link control layer.

25. A method for processing packet data received from a lower layer as recited in claim 13, wherein the packet data together with the appended data structure are passed directly or indirectly to an application layer.

26. A method for processing packet data received from a lower layer as recited in claim 13, wherein the packet data together with the appended data structure are passed to one selected from the group consisting of logical link layer, a network layer, a transport layer, a session layer, a presentation layer and an application layer.

27. A packet data processor for parsing received packet data in-line with streaming the packet data to an upper layer, comprising:
a memory configured to receive executable microcode defining a type of data structure to be built from the received packet data;
a pipeline register stage having a plurality of registers for sequentially receiving and temporarily storing words of the received packet data, each of the plurality of registers in the pipeline register stage being coupled to a pipeline multiplexor capable of reading a portion of the words temporarily stored in the pipeline register stage;
an analyzing computer configured to examine the received packet data output from the pipeline multiplexor, and storing a element of the received packet data generated by the analyzing computer into a register file; and
an execution logic unit configured to receive the executable microcode from the memory, the execution logic unit being designed to control the examination of the received packet by the analyzing computer.

28. A packet data processor for parsing received packet data in-line with streaming the packet data to an upper layer as recited in claim 27, wherein the executable microcode contains instructions identifying word locations of interest in the received packet.

29. A packet data processor for parsing received packet data in-line with streaming the packet data to an upper layer as recited in claim 28, wherein the pipeline register stage is coupled to a first-in first-out memory that streams the received packet data to an output multiplexor, the streaming being configured to occur while the analyzing computer examines the identified word locations of interest.

30. A packet data processor for parsing received packet data in-line with streaming the packet data to an upper layer as recited in claim 29, wherein the register file containing the element of the received packet data generated by the analyzing computer is transmitted to the output multiplexor.

31. A packet data processor for parsing received packet data in-line with streaming the packet data to an upper layer as recited in claim 30, wherein the register file contains the type of data structure resulting from information set by the executable microcode.

32. A packet data processor for parsing received packet data in-line with streaming the packet data to an upper layer as recited in claim 31, wherein the type of data structure resulting from information set by the executable microcode is passed to the output multiplexor to be appended to the packet data received from the first-in first-out memory.

33. A packet data processor for parsing received packet data in-line with streaming the packet data to an upper layer as recited in claim 32, wherein the type of data structure contains the element of the received packet data generated by the analyzing computer.

34. A packet data processor for parsing received packet data in-line with streaming the packet data to an upper layer as recited in claim 28, wherein the type of data structure is selected from the group consisting of a pointer data structure, a packet parts data structure, a hashed packet parts data structure, a flag data structure and a field data structure.

35. A packet data processor for parsing received packet data in-line with streaming the packet data to an upper layer as recited in claim 34, wherein the element is a flag bit to be stored in the flag data structure.

36. A packet data processor for parsing received packet data in-line with streaming the packet data to an upper layer as recited in claim 34, wherein the element is a data part to be stored in the packet parts data structure.

37. A packet data processor for parsing received packet data in-line with streaming the packet data to an upper layer as recited in claim 34, wherein the element is a multi-bit combination to be stored in the field data structure.

38. A packet data processor for parsing received packet data in-line with streaming the packet data to an upper layer as recited in claim 34, wherein the element is a pointer to a header to be stored in the pointer data structure.

39. A packet data processor for parsing received packet data in-line with streaming the packet data to an upper layer as recited in claim 34, wherein the element is compressed data to be stored in the hashed packet parts data structure.

40. A packet data processor for parsing received packet data in-line with streaming the packet data to an upper layer as recited in claim 27, wherein the analyzing computer includes a CRC module for performing a CRC check and stripping a CRC field from the received packet data in response to control signals received from the execution logic unit.

41. A packet data processor for parsing received packet data in-line with streaming the packet data to an upper layer as recited in claim 27, wherein the analyzing computer includes a hashing module for compressing at least a part of the received packet data in response to control signals received from the execution logic unit.

42. A packet data processor for parsing received packet data in-line with streaming the packet data to an upper layer as recited in claim 27, wherein the analyzing computer includes a programmable checksum generator for performing polynomial divider operations in response to control signals received from the execution logic unit.

43. A packet data processor for parsing received packet data in-line with streaming the packet data to an upper layer as recited in claim 27, wherein the analyzing computer includes a content addressed memory unit for performing value comparisons in response to control signals received from the execution logic unit.

44. In a packet data processor for processing packet data in-line with the streaming of the packet data to a transmit media access controller that is configured to transmit the packet data over a network link, a method comprising:

identifying a packet to be transmitted over the network link;

generating a tag header;

generating a cyclic redundancy check header (CRC); and appending the cyclic redundancy check header and the tag header to the packet that was identified to be transmitted over the network link before being streamed to the transmit media access controller, wherein at least one selected from a group consisting of identifying the packet, generating the tag header, generating the CRC header, and appending the CRC header is performed in-line while packet data is being streamed through the processor.

45. The method as recited in claim 44, wherein the tag header is a VLAN header.

46. The method as recited in claim 45, wherein the cyclic redundancy check header is generated for the packet data including the tag header.

47. The method as recited in claim 46, wherein the processing of packet data in-line with the streaming of the packet data is performed on 32 bit words.

48. The method as recited in claim 47, further comprising:

replacing of media access control destination and source fields, the replacement being selectively performed to enable IP fowarding.

49. A method reconstructing packet data in-line with the streaming of the packet data to a physical media, comprising:

fragmenting an Ethernet packet into a plurality of sub-packets;

reassembling the plurality of sub-packets of the Ethernet packet into a plurality of ATM cells; and appending an ATM header to each of the plurality of ATM cells before being streamed to the physical media, wherein at least one selected from a group consisting of fragmenting the Ethernet packet, reassembling the plurality of sub-packets of the Ethernet packet, appending the ATM header to each of the plurality of ATM cells is performed in-line while packet data is being streamed to the physical media.

replacing of media access control destination and source fields, the replacement being selectively performed to enable IP forwarding.

50. A method reconstructing packet data in-line with the streaming of the packet data to the physical media as recited in claim 49, wherein the fragmenting, the reassembling and the appending is performed in-line on 32-bit words.

51. A method reconstructing packet data in-line with the streaming of the packet data to the physical media as recited in claim 50, wherein the fragmenting is IP fragmentation.

* * * * *